(12) United States Patent
Rogers et al.

(10) Patent No.: US 8,477,616 B1
(45) Date of Patent: Jul. 2, 2013

(54) METHOD FOR ACHIEVING HIGH-AVAILABILITY OF ITINERARIES IN A REAL-TIME NETWORK SCHEDULED PACKET ROUTING SYSTEM

(75) Inventors: Steven Rogers, Alton, NH (US); Sean Moore, Hollis, NH (US); Joseph Greenwald, Madbury, NH (US); Scott Ball, Newmarket, NH (US)

(73) Assignee: Avaya Inc., Basking Ridge, NJ (US)

( * ) Notice: Subject to any disclaimer, the term of this patent is extended or adjusted under 35 U.S.C. 154(b) by 2385 days.

(21) Appl. No.: 10/345,897

(22) Filed: Jan. 16, 2003

Related U.S. Application Data

(63) Continuation-in-part of application No. 10/162,454, filed on Jun. 4, 2002, now Pat. No. 7,764,665.

(60) Provisional application No. 60/295,943, filed on Jun. 5, 2001, provisional application No. 60/296,238, filed on Jun. 6, 2001, provisional application No. 60/349,115, filed on Jan. 16, 2002.

(51) Int. Cl.
*H04L 12/28* (2006.01)

(52) U.S. Cl.
USPC ............................ 370/235; 370/252; 370/389

(58) Field of Classification Search
USPC ............... 370/395.4, 395.41, 395.42, 395.31, 370/248, 252, 254, 389, 395.51, 229–238; 711/216, 221
See application file for complete search history.

(56) References Cited

U.S. PATENT DOCUMENTS

| | | | | |
|---|---|---|---|---|
| 4,074,232 A | * | 2/1978 | Otomo et al. ................. | 714/750 |
| 5,042,032 A | * | 8/1991 | Dighe et al. .................. | 370/231 |
| 5,130,978 A | * | 7/1992 | Mobasser ..................... | 370/231 |
| 5,926,101 A | * | 7/1999 | Dasgupta .................. | 340/825.02 |
| 2001/0033572 A1 | * | 10/2001 | Caldara ......................... | 370/395 |
| 2001/0053149 A1 | * | 12/2001 | Mo et al. ....................... | 370/389 |
| 2002/0118642 A1 | * | 8/2002 | Lee ................................ | 370/230 |
| 2002/0131423 A1 | * | 9/2002 | Chan et al. .................... | 370/400 |
| 2003/0016679 A1 | * | 1/2003 | Adams et al. ................. | 370/401 |

OTHER PUBLICATIONS

Network Working Group, OSPF Version 2 (RFC 2328), Apr. 1998, pp. 13.*
Paul Spraglie and Dale Wisler, Relative Timings a Solution for Asymmertic Propagation Delay, Apr. 15, 2002, Cetocean Netowrks.
Sean Moore, A Scalable Method for Interdomain Scheduling in Realtime IP Networks, 2001, Cetacean Networks.
Sean Moore and Steve Chen, Availability of Scheduled Itineraries on IP Internetworks with Applications to VoIP, Sep. 2001, Cetacen Networks.

* cited by examiner

*Primary Examiner* — Steven H Nguyen
(74) *Attorney, Agent, or Firm* — Anderson Gorecki & Rouille LLP

(57) ABSTRACT

A system using scheduled times for transmission at each link guarantees bandwidth for transmitting data across a packet network. A scheduling agent determines availability of data paths across a network according to pre-selected criteria and real-time network topology information. Precise schedules are determined for transmission and reception appointments for data packets to traverse each link and switch in the network including compensation for transmission delays and switch latencies, resulting in a fixed packet flow itinerary for each connection. Itineraries are communicated to schedule-aware switches and endpoints and appointment times are reserved for transmission of the scheduled data packets. Scheduled packets arriving at each switch are forwarded according to their predetermined arrival and departure schedules, rather than their headers or contents, relieving the switches from making real-time routing decisions. Any unscheduled transmission times remain available for routing of unscheduled packets according to their IP headers. Real-time transmission of data can be guaranteed in each scheduled path, and schedule selection criteria may be adjusted according to network utilization and tolerable setup delay and end-to-end delay.

16 Claims, 31 Drawing Sheets

Scheduled Packet Switch Architecture
Block Diagram

Scheduled Packet Switch Architecture Block Diagram

FIG. 9
Table 301
Example Switch Connection Matrix

| Node | A1 | A2 | A3 | B1 | B2 | B3 | C1 | C2 | D1 | D2 | D3 | E1 | E2 | E3 | F1 | F2 | F3 | F4 |
|------|----|----|----|----|----|----|----|----|----|----|----|----|----|----|----|----|----|----|
| A1 |   | ? | ? |   |   |   |   |   |   |   |   |   |   |   |   |   |   |   |
| A2 | ? |   | ? |   |   |   |   |   | ? |   |   |   |   |   |   |   |   |   |
| A3 | ? | ? |   |   |   |   |   |   |   |   |   |   |   |   |   | ? |   |   |
| B1 |   |   |   |   | ? | ? |   |   |   |   |   |   |   |   |   |   |   |   |
| B2 |   |   |   | ? |   | ? |   |   |   |   |   |   | ? |   |   |   |   |   |
| B3 |   |   |   | ? | ? |   |   |   |   |   |   |   |   |   |   |   |   | ? |
| C1 |   |   |   |   |   |   |   | ? |   |   |   |   |   |   |   |   |   |   |
| C2 |   |   |   |   |   |   | ? |   |   |   |   |   |   |   |   |   | ? |   |
| D1 |   | ? |   |   |   |   |   |   |   | ? | ? |   |   |   |   |   |   |   |
| D2 |   |   |   |   |   |   |   |   | ? |   | ? | ? |   |   |   |   |   |   |
| D3 |   |   |   |   |   |   |   |   | ? | ? |   |   | ? |   |   |   |   |   |
| E1 |   |   |   |   |   |   |   |   |   | ? |   |   | ? | ? |   |   |   |   |
| E2 |   |   |   |   | ? |   |   |   |   |   | ? | ? |   | ? |   |   |   |   |
| E3 |   |   |   |   |   |   |   |   |   |   |   | ? | ? |   | ? |   |   |   |
| F1 |   |   |   |   |   |   |   |   |   |   |   |   |   | ? |   | ? | ? | ? |
| F2 |   |   | ? |   |   |   |   |   |   |   |   |   |   |   | ? |   | ? | ? |
| F3 |   |   |   |   |   |   |   | ? |   |   |   |   |   |   | ? | ? |   | ? |
| F4 |   |   |   |   |   | ? |   |   |   |   |   |   |   |   | ? | ? | ? |   |

Figure 17 - Example of Scheduled Network in Operation

Figure 22 - Node Traversal Request (NTR) Queueing System

Figure 24 – Example ISG with Two (2) Leaves

Distributed Itinerary Search

METHOD FOR ACHIEVING HIGH-AVAILABILITY OF ITINERARIES IN A REAL-TIME NETWORK SCHEDULED PACKET ROUTING SYSTEM

RELATED APPLICATIONS

This application is a Continuation In Part of U.S. patent application Ser. No. 10/162,454, entitled "Real-Time Network Scheduled Packet Router System," filed Jun. 4, 2002 now U.S. Pat. No. 7,764,665, which claims priority from U.S. Provisional Application No. 60/295,943, filed Jun. 5, 2001 and U.S. Provisional Application No. 60/296,238, filed Jun. 6, 2001. This application claims priority from U.S. Provisional Application No. 60/349,115, filed Jan. 16, 2002. The application is also related to U.S. Ser. No. 10/286,013, entitled "Generation of Redundant Scheduled Network Paths Using a Branch and Merge Technique," filed Nov. 1, 2002, and U.S. Ser. No, 09/746,744, entitled "Network Switch With Packet Scheduling," filed on Dec. 22, 2000.

BACKGROUND OF THE INVENTION

The present invention relates generally to a software and hardware system that provides the scheduled delivery of data packets through a network. Additionally, the currently disclosed system guarantees the transmission, routing and reception of IP data packets through a computer network such that the packet delivery can meet the strict delay and bandwidth requirements of real-time and near real-time application uses for the Internet, Telephone, and other types of computer networks.

The present disclosure presents an advancement in the state-of-the-art for real-time data packet switching networks using end-points such as telephones, personal computer systems, large enterprise servers, Internet appliances or any other general or special purpose data storage or data collection device.

Many organizations have had a longstanding desire to migrate real-time applications from expensive, proprietary systems and networks to the rapidly expanding Internet Packet-based (IP) technologies. Examples of such applications are factory automation, industrial process control, data acquisition for synthetic aperture radar systems (SAR), instrumentation and monitoring systems. Additionally, the disclosed invention will support all application areas using voice over IP (VoIP) and video conferencing. Such applications place a high premium on real-time packet delivery, as both types of applications will deliver unacceptable levels of quality when the real-time requirements cannot be met.

Real-time applications fall into two primary groups: those that respond in "hard" real-time, and the others in "soft" real-time. The latter are applications with less severe requirements. It is the general nature of such a system to modify a process based on the measurements from that process. This has serious implications for both the operating system and the network that is used to collect and distribute data. A hard real-time operating system must provide a response to some kind of event within a specified and precise time window. This response must be predictable and independent of other activities undertaken by the operating system. Providing this response implies that system calls will have a specified, measured latency period. Hard real-time systems often employ specific hardware devices with special device drivers. The IEEE instrumentation buses are an example. While the IEEE bus can meet the real-time constraints for most if not all applications, it is limited in length and the separation between the devices that can be attached to the bus. It can be observed that regardless of the responsiveness of the operating system, the data network (or bus) must be able to receive or transmit data for the operating system within the same real-time constraints. Standard IP networks have not been able to satisfy the hard real-time requirements of most hard real-time applications.

By contrast, a soft real-time operating system is one that has less severe constraints on "lateness," but still must operate quickly within fairly consistent time constraints. That is, it must be good enough to service events so that the response should be satisfied, on average. Most off-the-shelf industry standard operating systems meet this definition. Depending on the application, IP networks can at times meet this constraint but are not predictable in performance without special Quality of Service features and perhaps, over provisioning the network. It is commonly understood that as soon as the bandwidth of such a network is fully saturated, the "next" IP data packet will cause the network to become non-deterministic in terms of response time and overall performance.

It can be seen that within both hard and soft real-time systems, there are two fundamental requirements for real and near-real-time computer-based systems. First, the computer's operating system software must be responsive enough to support software applications that must execute tasks against a precise schedule. Second, the network, which usually interconnects a number of supporting peripheral subsystems, must be able to deliver data packets to and from the software application in a timely enough fashion as to not violate the real or near real-time constraints implicitly or explicitly imposed by the application.

For example, for a SAR unit, the network must be able to transmit the current radar image to a signal-processing computer where it will be analyzed. This operation, although highly simplified for this example, must be completed before the SAR presents another image for processing. It is understood by those schooled in the art that regardless of the performance of the computer system, if the network does not transfer the SAR data fast enough for the analysis to complete, or vice-versa, important data that may be contained in the next SAR scan will be lost.

In many hard real-time systems, a special purpose Real-time Operating System (RTOS) may be employed. A RTOS is a special multi-tasking control system specifically designed to guarantee execution of a software program on a programmable but very specific time schedule. An RTOS must also be very responsive to data that may be presented, on a scheduled or unscheduled basis, to the system for processing. It is thus imperative that the network used to collect and distribute data from a RTOS have the ability to be just as responsive and predictable. It is commonly understood that Ethernet and IP packet switching systems are in fact, not consistently responsive or predictable in terms of their scheduled delivery of data packets. These classes of switches, despite substantial advances in delivered bandwidth, suffer from unpredictability due to packet collisions and variable packet delays.

For example, problems will almost certainly arise when multiple applications or even multiple threads within a single application, compete for a single port's resources on an instantaneous basis. Most likely, these applications and threads will interfere with each other, causing variable delays to occur in the transmission or reception of one or more packets. Some system designers have attempted to mitigate this problem by installing multiple network interface cards in the host computer (called multi-homing). This technique does reduce packet collisions and variable packet delays as compared to a single network interface card but bandwidth issues will eventually reappear when the high-speed network interface cards deplete the available bandwidth of the host's I/O.

Typically, traditional network switching equipment is not able to meet the real-time constraints that define a real-time or near-real-time application. In existing systems, attempts have been made to address these problems by assigning priorities to packets of different types. In such existing techniques, packets with real-time needs may be assigned a relatively higher priority, so that they are processed before lower priority packets that do not need real-time delivery. Unfortunately, prioritized packet processing does not improve performance in the case where all packets have equivalent priorities. An example of an application in which this scenario arises is voice telephony. In general, many simultaneous telephone calls may be transported on a single port connection. It is not typically known which, if any, of the packets carrying data for such telephone calls should be given higher priority. When multiple priority voice packets are mixed in a single channel, non-deterministic packet congestion and delay may result that is disruptive to a telephone call.

One should not confuse the present disclosed invention with the Real Time Protocol (RTP) a proposed Internet Standard (RFC 1889), commonly used in IP networks. RTP can be used to provide end-to-end delivery services for applications such as those previously listed. RTP services include payload type identification, sequence numbering, time-stamping and delivery monitoring. RTP also supports data transfers to multiple destinations using multicast distribution if provided by the underlying network. While this type of broadcast mechanism can significantly increase the effective instantaneous performance of the network, multicasting provides very limited to no benefit in point to point applications such as those found in telecommunications. Note that RTP itself does not and cannot provide any mechanism to ensure timely delivery or provide other quality-of-service guarantees. RTP relies on lower-layer services to do so. It also does not guarantee packet delivery or prevent out-of-order packet delivery. RTP makes no assumption that the underlying network is reliable or that it delivers packets in sequence. The packet sequence numbers included in RTP are perhaps useful for the reconstruction of the sender's packet sequence or to determine the proper location of a packet, for example in video decoding, without necessarily decoding packets in sequence.

The features articulated for RTP, while allowing for an efficiency of processing packets post delivery, provide no guarantees that packet delivery will remain within the constraints of a hard real-time system.

BRIEF SUMMARY OF THE INVENTION

A system of switches and end-points using scheduled times for transmission at each link guarantees bandwidth for transmitting data across a packet network. A scheduling agent determines availability of data paths across a network according to pre-selected criteria and real-time network topology information. Precise schedules are determined for transmission and reception appointments for data packets to traverse each link and switch in the network including compensation for transmission delays and switch latencies, resulting in a fixed packet flow itinerary for each connection. Itineraries are communicated to schedule-aware switches and endpoints and appointment times are reserved for transmission of the scheduled data packets. Scheduled packets arriving at each switch are forwarded according to their predetermined arrival and departure schedules, rather than their headers or contents, relieving the switches from making real-time routing decisions. Any unscheduled transmission times remain available for routing of unscheduled packets according to their IP headers. Real-time transmission of data can be guaranteed in each scheduled path, and schedule selection criteria may be adjusted according to network utilization and tolerable setup delay and end-to-end delay.

In accordance with principles of the invention, a real-time packet switching system is disclosed herein that is capable of allocating bandwidth to each one of multiple real-time applications or each one of multiple real-time application processing threads within a multi-tasking operating system such that packet delay is controlled and guaranteed packet delivery is provided. The disclosed system provides guaranteed bandwidth allocation that alleviates transmission problems caused by bandwidth contention. The disclosed system allocates bandwidth for use during respective real time communication sessions. Operation of the disclosed bandwidth allocation system does not degrade the packet switching performance of other packet traffic except to the extent that available bandwidth on the affected ports is decreased in proportion to the amount of scheduled traffic reservations on that port.

The present disclosure includes a scheduling system which may be added to a conventional packet switch architecture. A switch modified in accordance with the invention may be called a "Scheduled Switch" or a "Scheduled Switch/Router" or "SSR." The disclosed packet scheduling system provides software interfaces to allow an application to request a scheduled path as well as have the Scheduling Software and switch hardware dynamically construct and maintain a scheduled path. Such scheduling is applied separately to the transmit and receive functions within each port of a switch. The disclosed real-time packet scheduling system is able to operate in accordance with the real-time as well as non real-time needs of kernel and user level operations within any multi-user, multi-tasking, special purpose or real-time software operating system, or any software application in terms of guaranteed bandwidth and controlled delay. Additionally, the present disclosure may be applied to any IP based communications medium including wireless.

For the purposes herein, the term Real-Time Network Scheduled Packet Routing System (RTNSPRS), or more simply, Real-Time Packet System (or "Scheduled Network"), refers to a set of unique hardware and software modules that, when used with schedule-aware end points (SEPs, also referred to herein as "SEDs", schedule aware end devices), will allow two or more of those end points to communicate, with real-time characteristics, over an IP network such that bandwidth is guaranteed and network delays are controlled and deterministic. Furthermore, unlike a typical IP network where some packet loss is expected due to queuing delays, scheduled connections operating as part of the RTNSPRS have essentially no packet loss. A SEP can be any device capable of transmitting and receiving packets on a scheduled time table as calculated and dictated by a Schedule Agent. Some examples of SEPs are IP telephones, industry standard servers, desk top PC Clients, network storage systems and various network.

Note that the system according to the invention described herein, is generalized to the notion of moving IP data packets from one end point to one or more other end points. In general it is not important to the system as to what type of end points are configured. As long as the end points adhere to the fundamental specifications for the transmission and reception of scheduled IP packets, the system will transport packets at maximum bandwidth with controlled delays until all resources are used. Additionally, the system described herein is not sensitive to various IP overlaying technologies such as Voice over IP (VoIP) or Digital Video over IP (DVoIP).

For the purposes herein, the term "packet flow" is used to refer to those packets associated with a specific application. A packet flow is further considered herein to refer to a unidirectional flow of packets between a transmitting host and a receiving host that is associated with an application. Within each switch, the disclosed scheduling system is based on the occurrence of schedules. Schedules are comprised of expected time periods (called "appointments") during which packet transmissions and/or receptions are configured for handling one or more packet flows.

Schedules are provisioned independently at each link within each switch within the network. A given schedule applies independently to the transmit and receive functions of all links, or a subset of links, within a switch, or to a subset of the transmit and/or receive functions of one or more links within a switch. Accordingly, a given link may operate based on a single schedule, or on multiple schedules. Schedules may operate once or be repeated continuously. Alternatively, each schedule may be triggered explicitly in response to an event.

Within a schedule interval, packet flow offsets define the beginnings of packets or packet groups associated with packet flows. These offsets are also called appointments. In the case where a packet flow offset is associated with the transmit function of a link, that packet flow offset defines a time within a schedule interval at which transmission of one or more packets for the associated packet flow may be initiated. In the case where a packet flow offset is associated with a receive function of a link, that packet flow offset defines a point in time within a schedule interval at which reception of one or more packets for the associated packet flow may be expected. For a given packet flow, different packet flow offsets are established for each link along the path between endpoints. The set of offset values associated with a packet flow for all links along such a path defines the schedule for that, packet flow (also referred to as a "packet flow schedule").

A packet flow schedule may also include a schedule interval duration and packet length. A time period within the schedule interval associated with a given packet flow schedule is referred to as the packet flow schedule period. Individual packet flow schedules are determined based on the needs of the application associated with the packet flow, and a computed best transit path through the network. Packet flow schedules can be granted to any application, up to the bandwidth limitations of the relevant communications channel. A packet flow schedule associated with an application guarantees that application time during which it can place one or more packets into a transmission path. Packet flow schedules can be allocated to any application in any order or sequence, until all of the transmission time for the channel is allocated. Any unallocated transmission opportunities may be used to transport conventional packet traffic, which may be switched and forwarded as in existing systems.

When a packet flow is established, the associated packet flow schedule is coordinated between the links along the path between the endpoints for that packet flow. Based on this packet flow schedule, a given link may transmit a guaranteed bandwidth packet for the packet flow based on the packet flow schedule to the next link along the path to the receiving host. Also based on this packet flow schedule, the next link will expect the arrival of the guaranteed bandwidth packet at a time indicated by the packet flow schedule. In this way, based on the formation of the packet flow schedule across the links within the path, dedicated bandwidth is provided between any given set of endpoints.

Accordingly, when a link forwards a packet (transmits), based on the packet flow schedule, the packet is automatically transmitted, without delay, to the next link's receiver. For any given link, a given packet flow schedule is active for that link through the switch, in one direction only. Thus, each link may have two dedicated schedule intervals, one for the transmit function and one for the receive function. For the real-time session to be established, the packet flow offsets associated with transmitting packets and the packet flow offsets associated with receiving packets will coincide, through each link along the path. The set of packet flow offsets associated with a given packet flow, across the set of switches along the path for that packet flow is also sometimes referred to herein as the "packet itinerary" for that packet flow, or, more generally, an "itinerary."

Guaranteed bandwidth packets that are transmitted using the disclosed scheduling system are referred to as "scheduled" packets. Included in the computation of flow schedules are the delays associated with the transmission path and with the switching systems within the switches themselves. The disclosed system requires that an endpoint transmitter be able to coordinate its transmissions with all the links along the path to the endpoint receiver. Each link carrying a scheduled packet must be schedule coordinated with the next link along the path to the endpoint receiver for the associated packet flow.

Negotiation or coordination with the last link in the path is not required of the endpoint receiver. The last link in the path only sends the endpoint receiver packets according to the packet flow schedules associated with that endpoint. Since the endpoint receiver receives all of its packets from the last link in the path, that same link will control the delivery of all packets to that receiver. Thus, the endpoint receiver does not generally need to coordinate schedule information. The endpoint receiver will always receive guaranteed bandwidth packets at the correct time.

The endpoint receiver may normally derive any application timing information it needs to schedule the playing of the information contained in the real-time packets, from the packets themselves. Guaranteeing packet delivery times greatly reduces the need to maintain large packet jitter buffers, to counter jitter or even packet collision and retransmission problems. Since the endpoint receiver always receives the next packet in the sequence, on time, it does not require extensive jitter buffering.

Real time packet flows between switches are accomplished by coordinating schedules between switches. This interswitch coordination is accomplished by means of a special application that computes and delivers schedules between switches. This application must have knowledge of schedule flows, the delays in switches and in the links between switches, the link speeds, and the network topology. When the schedule application receives a request it can thus compute the fastest schedule through the network of switches for the packet flow.

Furthermore, the process for scheduling real-time packet flows can be adjusted according to network and application requirements of utilization and delay. In particular, the method of searching for a path and the necessary itinerary between designated endpoints can include variables that may permit a higher probability of finding an available path.

Also, the present invention can be implemented in a centralized or a distributed architecture, with the necessary accommodations for other factors, as further described herein.

BRIEF DESCRIPTION OF THE DRAWINGS

The accompanying drawings, referred to herein and constituting a part hereof, illustrate the exemplary embodiments of the system and method for real-time network scheduled packet routing of the present invention and, together with the description, serve to explain the principles of the invention.

FIG. 9 shows an exemplary switch connection matrix according to an illustrative embodiment of the present invention.

DETAILED DESCRIPTION OF THE INVENTION

Figure 1A:
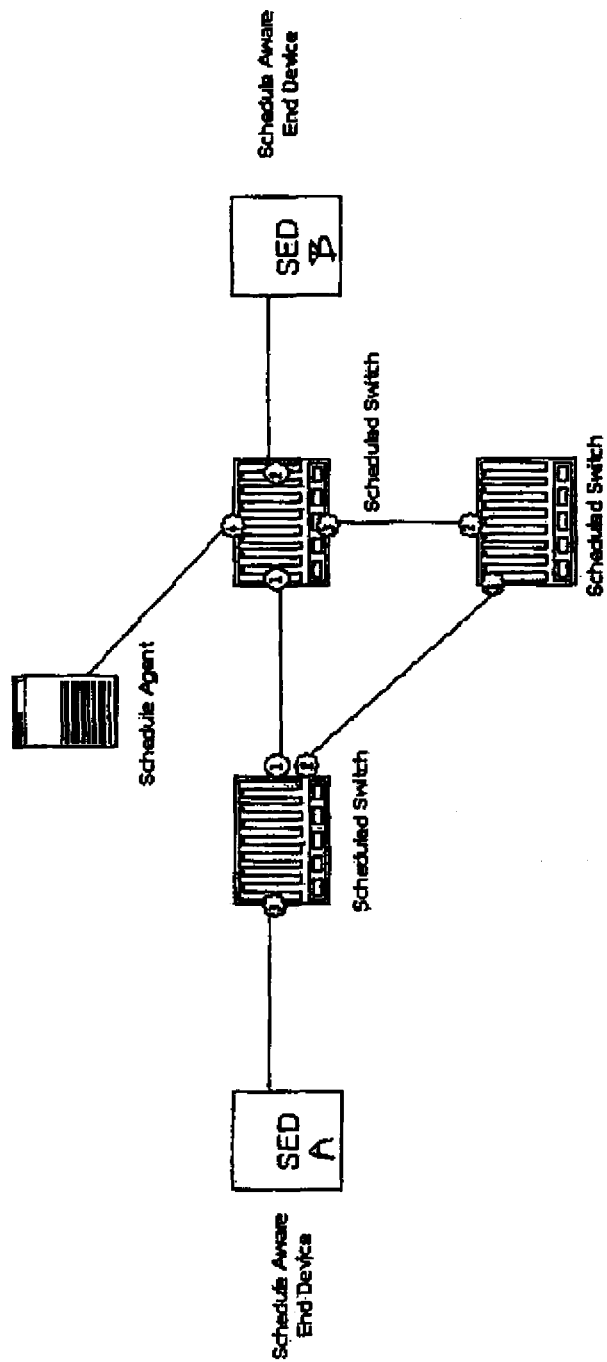
FIGS. 1A and 1B show a high-level block diagram of the disclosed Scheduled Packet System.
Figure 1B:
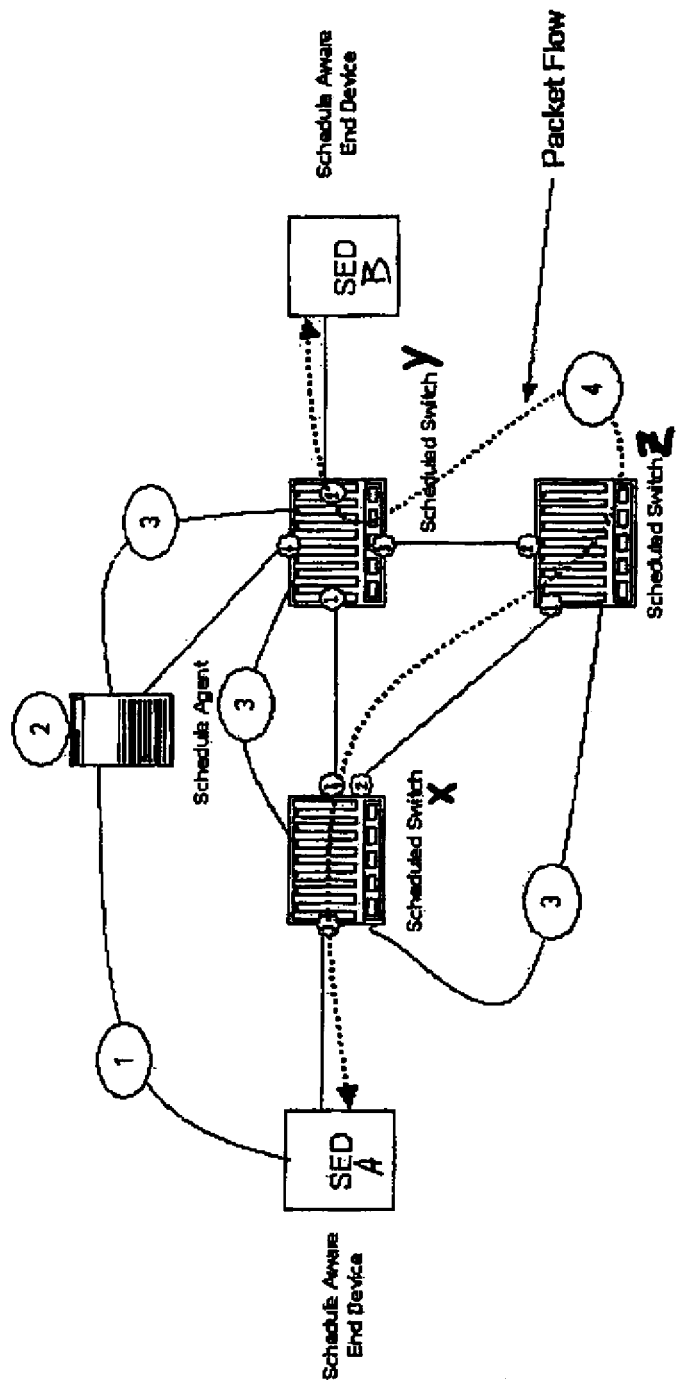

FIGS. 1A and 1B show the basic architecture of the currently disclosed invention. There are three subsystems required for a Scheduled IP Data Packet Switching System and are shown as follow: A Schedule Aware Endpoint Device (SED or SEP) is any IP compatible network device that is capable of transmitting and receiving data packets to a precisely contrived schedule. The Scheduled Switches (A), (B), and (C), are special IP Packet switches that can maintain a precise schedule for receiving and forwarding packets as determined by the SA. The Scheduled Switches are interconnected through their various links as indicated. A Schedule Agent (SA) is a software application that is hosted by a general-purpose computer. The SA is responsible for pre-configuring the Scheduled switches such that they operate on a precise schedule for particular data packets.

As shown, the disclosed Scheduled Packet Switching architecture differs from traditional IP routing and switching systems in that the entire network is pre-configured, controlled and monitored by a centralized function called a Schedule Agent (SA). The primary functions of the SA are manifested in the form of a software program that is hosted by an industry standard computer. Although the functions of the SA are centralized relative to the network, the SA function can be implemented in a standalone fashion (as shown), or geographically distributed over long distances. Additionally, because the SA is a software application, it can be hosted by servers that are configured as clusters for more performance and high availability, or by hardened fault tolerant computers for the most demanding mission critical applications.

There is no explicit requirement for the SA to be a dedicated computer. The SA software can also operate as one of a number of applications running within a multi-tasking or multi-user server. There is no requirement that the SA computer be limited to one computer. Any number of SAs can be added to the architecture to provide more capacity and higher availability via redundancy. The SA function is capable of working as one of a distributed set of SAs that may be geographically separated into multiple switch domains.

Having complete knowledge of the state of the ports in each of the switches, the SA selects, reserves and schedules the connection from one end point to another, as illustrated and described below in FIGS. 15 and 16. For one-way or half-duplex communications a single path must be set up. For full-duplex operation, two paths are typically set up for the transmission and receiving functions for the endpoints. This full-duplex connection allows the endpoints to transmit to each other at the same time, providing for normal overlapped conversation when used in a voice application. In the case of multicasting IP packets, the SA may be required to assign and schedule many paths through the network.

Although the SA has ultimate control of the scheduled state of its underlying network, the Scheduled Switch hardware can also be configured to always attempt to route unscheduled IP traffic independent of the SA, using open (unscheduled) appointments. However the SA has priority when it sets up a schedule path, doing so at the expense of available bandwidth for unscheduled traffic. When a scheduled packet is traversing each link during its scheduled appointment times, unscheduled traffic is held in a queue to be forwarded only when an open schedule is available.

There are four basic operations that must occur to utilize the full feature set of the disclosed invention. The steps are illustrated in FIG. 1B. Assuming that the SED (A) wants to set up a real-time IP session with SED (B), the following steps must occur:
1. SED(A), as part of the feature set of a Schedule-Aware Endpoint, establishes a real-time session with SED(B) by requesting from the Schedule Agent, a scheduled path through the network.
2. When the SA receives this request, it will examine the state of the underlying network by referencing its own database. If there is no itinerary available that meets the requirement of the real-time session, the set up request from SED(A) is rejected. If the SA can schedule an itinerary, then,
3. The SA sends a string of command packets using the Network Scheduling Protocol, to each of the Scheduled Switches to reserve a scheduled appointment at each of the required links. In this example, the SA determined that a scheduled path between SED(A) and SED(B) can be accommodated via links (X3), (X2), (Z1), (Z2), (Y3), and (Y2). The schedule is thus arranged with each component so that SED(A) transmits along a link to switch X at port 3, then from port 1 of X on a link to port 1 of switch Z, then from port 2 of Z to port 3 of Y, and from port 2 of Y to SED(B), each such transmission occurring at the time corresponding to a pre-selected appointment, as further described below.
4. Once the Scheduled Switches have reserved the appropriate appointments at each of the above links, SED(A) and SED(B) will be able to communicate with each other without the bandwidth being reduced due to other scheduled or unscheduled traffic. The illustrated data path is precisely controlled by the hardware such that other traffic is never flowing through the affected links during the session's assigned appointment schedule.

Figure 2:
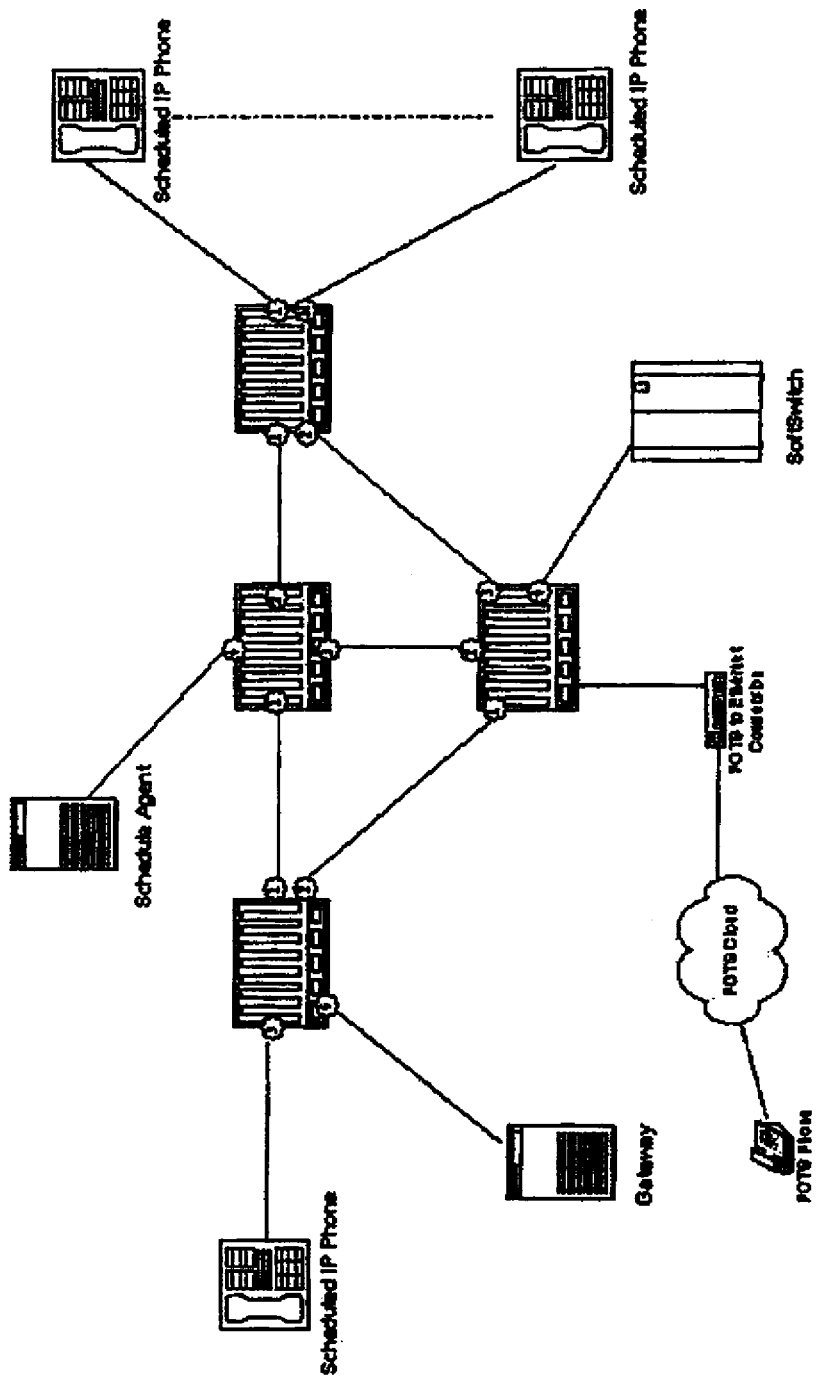
FIG. 2 shows a high-level block diagram of the disclosed Packet Scheduling System with a Scheduling Agent, two Schedule Aware Endpoints (SEPs), and a switched network. Note that this illustration shows the disclosed invention applied to a typical Voice over IP telephone application.
Figure 3:
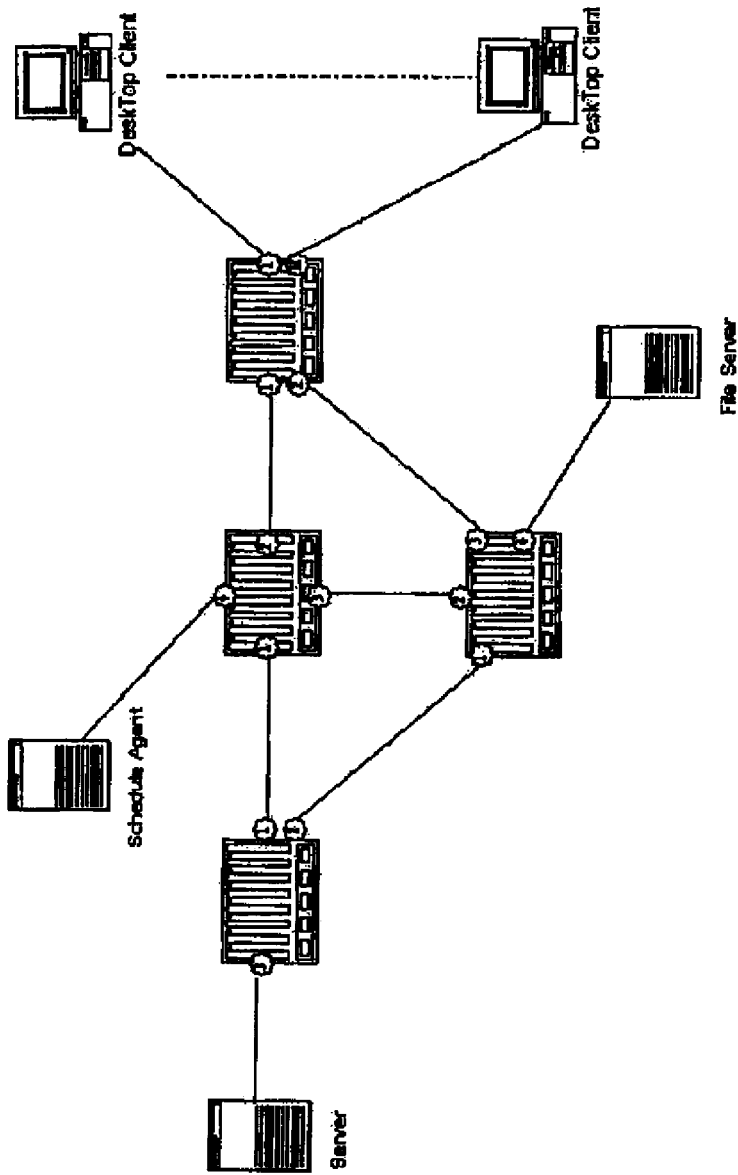
FIG. 3 shows a high-level block diagram configuration representing a computer data packet network. For a data packet system, the configuration shows a typical client server architecture where various desktop clients are serviced by an application server and a file server.

FIG. 2 and FIG. 3 show basic Scheduled Packet Switching configurations. The functional description of each block is as follows:

The Schedule Agent as shown is a standalone general-purpose computer as described above.

The Scheduled Switch which is described in detail in the parent application (see U.S. patent application Ser. No. 09/746,744, filed on Dec. 22, 2000, which is herein incorporated by reference in its entirety). In this illustration each switch has a plurality of links that are connection paths to other switches or endpoints.

The Scheduled Internet Protocol Telephone that is described in detail in U.S. patent application Ser. No. 09/780,685, which is herein incorporated by reference in its entirety, is a telephone with the added circuitry to transmit and receive voice data packets on a precise schedule as set up by the Schedule Agent.

The POTS to Ethernet Converter serves as an interface-converter for allowing legacy analog telephones (POTS equipment) to participate in a scheduled network. This conversion is necessary to retime their arbitrary (non-scheduled) transmissions and receptions of data packets so they can be transferred to and from the switches on a scheduled basis.

The Softswitch is a commercially available system that is used to provide call control functions and revenue producing functions such as billing and provisioning of services. A Softswitch may be adapted to operate as a Schedule Aware Broker (SAB). A SAB is a network entity that is capable of requesting an itinerary for a flow generated by an endpoint from the SA. SAB does not participate in the data flow forwarding. Those skilled in the art will appreciate that a SAB may also be implemented as part of a Schedule-Aware End Point, without loss of generalization of the term. It should also be application of the invention permits connections to be requested. For example, a specialized function within a network device may have data connection requirements that exceed the capabilities of the existing management and control protocols, and may thus need to open a "connection" to another device in the network to exchange freely formatted information.

The Gateway is a commercially available system intended to interface POTS (legacy telephone equipment), T1 lines, DS-3 lines, etc., into an IP network.

Overview of the Packet Scheduling Process Using Scheduled Switches

Figure 4:
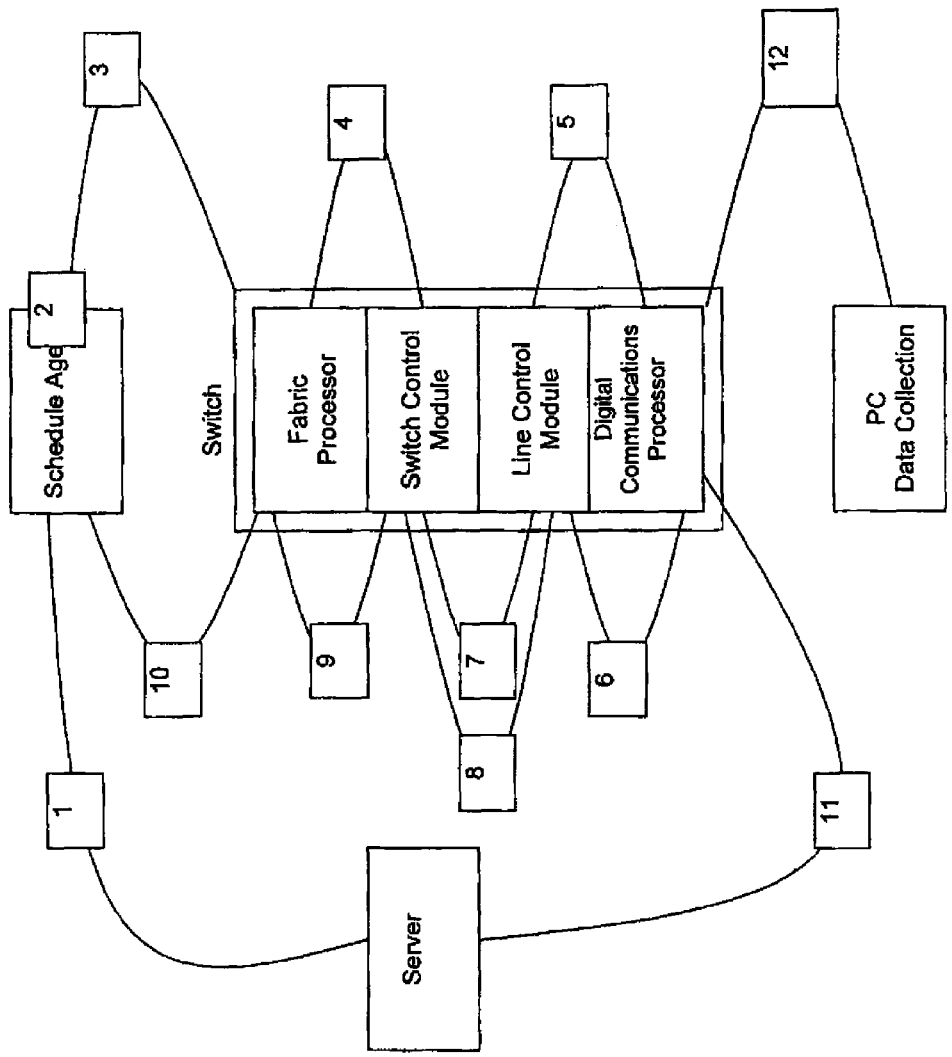
FIG. 4 is a more detailed block diagram showing a single switch architecture with more emphasis placed on the hardware subsystems within the Scheduled Switch.

Referring to FIG. 4, in this data flow example a Server (S) will request that a scheduled real-time session be set up with a PC-based data collection system (P).
1. The end node (S) requests that a scheduled path be setup between itself and the PC (P), by contacting the Scheduling Agent (SA).
2. The SA calculates the best route (path through the network) for the requested session.
3. The SA then attempts to reserve all of the appointments needed at each link to fulfill the request. The SA sends Networks Schedule Protocol (NSP) appointment reservation packets to each link along the path. Note that the NSP packets can be unscheduled traffic packets flowing across the network. Therefore, NSP packets can be mixed in with all other packets arriving on a medium at the Switch. Alternatively, NSP packets can be specially identified for expedited handling. As a further alternative, NSP packets maybe carried from an SA to a switch or SED using a fixed itinerary. The Networks Schedule Protocol (NSP) is described in further details in the parent application Ser. No. 09/746,744, for communication between the scheduling server (herein, the SA), and the switch management CPU (SMC) in each scheduled switch. It will be apparent to those skilled in the art that any number of point-to-multipoint communication protocols could be adapted to carry out the same functions as the NSP.
4. NSP traffic is redirected to the Switch Control Module (SCM) by the Fabric processor. The SCM analyzes the NSP packet to determine the type of command and the line card that will be used to process that command.

5. The SCM transmits the packet to the Line Control Module (LCM) across the mid plane Ethernet connection that is used to connect the SCM and LCM cards.
6. The LCM processes the NSP packet and passes the required pieces of data to the Digital Communications Processor.
7. The Network processor uses this data to establish an appointment in its itinerary list. If this appointment can be accommodated, the network responds to the LCM with an Acknowledgement (ACK). If this appointment cannot be accommodated for some reason, a Not-Acknowledged (NAK) message is sent back to the LCM.
8. The LCM creates a response NSP packet that is sent back to the SCM.
9. The SCM forwards this response back to the Fabric processor.
10. The Fabric Processor then switches the packet to the Digital Communications Processor that is connected to the SA. Assuming that the SA has received an ACK from the switch connected to the SA, the Server will now be in a position to send its data packets through the switch via a reserved packet itinerary that will then be guaranteed to run at full bandwidth as it will be unencumbered by either unscheduled traffic or scheduled traffic that is operating on a different schedule.
11. The Server (S) sends its data packets to the Switch's Network Processor. The Network Processor can receive both scheduled and unscheduled traffic. Scheduled traffic as from (S), is queued in the scheduled traffic queue, and transmitted at the time specified. Unscheduled traffic and NSP traffic is queued in the unscheduled traffic queue. When free appointments are available, any unscheduled traffic in the queue can be transmitted.
12. Data from the DCP is transmitted to the Personal Computer (P).

Brief Description of a Network Scheduling Protocol

To facilitate communication of network configuration and management information within the RTNSPRS, those skilled in the art will observe that a reliable protocol between the SAs and SSRs may be useful. Furthermore, it is useful for a SAB (either alone or implemented within a SEP or other device) to communicate with the SAs to coordinate connection information and transmission timing and other information as may be necessary or useful for improved management of the system. For the purpose of simplification of the discussion, the term SEP is used, whether the "end-point" functionality is implemented in an end-point communication device, or a softswitch, another SA, an SSR, or any other device reachable through the network.

In an illustrative embodiment, such a protocol is implemented as part of a Network Scheduling Protocol (NSP). A pre-configured NSP is used for real-time determination of switch and link status, forwarding connection and termination requests, distribution of itineraries, and discovery of existing itineraries that may have already been configured within the RTNSPRS.

The NSP may be implemented in accordance with similar functions found in a number of well-known data communication protocols in the Internet suite. In particular, a dynamic network discovery feature may be implemented by adapting suitable features of a routing protocol (such as OSPF, Open Shortest-Path First, RFC 2328) and discovery protocols (such as RAS protocol of CCITT-issued 11.323 described in the ITU-T H.225 recommendation). Similarly, resource requesting and reserving functions can be compared with those found in a Resource Reservation Protocol (such as RSVP, RFC 2205). As a resource provisioning protocol the corresponding portions of an NSP can be compared to functions found in Common Open Policy Service (COPS, RFC 2748). The interface indexing by the SSRs and SABs can be governed by the RFC2863 "The Interfaces Group MIB." Although an NSP may carry out these and other functions, it should be appreciated by those skilled in the art that each implementation will be tailored to the particular switches and end devices which comprise the RTNSPRS. Each referenced RFC is available from The Internet Engineering Task Force (IETF), or the RFC-Editor.org, via their respective web-sites.

At a link level, an SSR can be configured to recognize whether its network neighbor is configured as an SSR, and to report such information to an SA. As described elsewhere, a heartbeat protocol can also be implemented at the link level for detection of the operational status of each link or switch in the network. One may also use these link-level exchanges to convey additional configuration information between adjacent SSRs.

Information transfers between SAs and SSRs is preferably performed across a reliable transport protocol, such as the well-known TCP. Each SSR may be configured or otherwise learn the IP address of a corresponding SA. The NSP participants listen on the well-known port 7832 configured as either a TCP or UDP port. A reliable protocol can be provided for running on top of UDP to deliver some TCP-like functionality (such as ordered packet delivery, retransmission, and flow control). In a preferred embodiment, the interaction between the SA and SSR is handled as a peer-to-peer protocol, with each message requiring a reply (ACK/NAK). A NAK should convey a reason for rejection of the message. In general, an SA will initiate topology discovery, information gathering, and schedule distribution procedures. SSRs and SEPs can be configured to initiate exchanges with the SA upon occurrence of configured events (e.g., link up/down, neighbor discovery, requests from a SEP, etc). In general, schedule information in an SSR should not be modified without specific SA instruction to do so.

The message preferably contains fields for transmission of message type and a payload, and may also contain information for unique transaction numbering, request/response information, variable-length payload parameters, message authentication information, and other information as may be further deemed useful in an alternative implementation.

The specific contents of a payload in an NSP message will depend upon the type of message being sent. Some illustrative types of messages include: keep-alive, hello and goodbye messages; ACK/NAK; SA requests for interface (IIR) or schedule (SRR) reports; flow setup or deletion requests from SEPs; schedule flow additions or deletions from the SA; event reports from an SSR or SEP; and heartbeat reference interface changes.

For example, an SA uses an IIR message to discover network topology and to build and maintain its internal view of the domain. A full response to an HR should contain information about each interface of the addressed SSR. Such information may include: its identification, location, IP address, subnet mask, and type; the maximum number of scheduled and unscheduled flows on the interface; a buffer capability indicator; an MTU indicator (maximum transmission unit); a neighbor's address and index; an interface status code; and other information related to SEPs such as: aggregated timing shift; max jitter, and min and max interface timing offsets for starting scheduled flows.

Once the SA is aware of the network topology, a flow request from a scheduled endpoint device can be serviced. A flow request will preferably include: a flow identifier, source and destination addresses, bandwidth requirements (transmissions per second), packet size, maximum delay, and estimated duration of flow. Additional information may include SEP requests for other special features such as redundant routing for improved fault tolerance.

The SA will attempt to create an itinerary for the SEP, and will ACK the request if one is found, and NAK if the request cannot be serviced. To service a request, the SA will communicate the itinerary to the SEP and to at least each SSR in the selected path. The schedule setup request (ATSR) will preferably include the following information: an itinerary identifier, interface indices for incoming and outgoing flows; flow type and length; max packet size; and indicators for which appointments to receive and transmit packets, and how much buffering delay should be introduced. Additional information may be included, such as relates to "branching" functions, or update indicators. Further information about branching data into multiple simultaneous paths may be found in co-pending U.S. Ser. No. 10/286,013, GENERATION OF REDUNDANT SCHEDULED NETWORK PATHS USING A BRANCH AND MERGE TECHNIQUE, filed Nov. 11, 2002, which is hereby incorporated herein by reference in its entirety.

Once an itinerary has been communicated to an SSR, the SA may use various other commands adapted for the purpose of confirming or changing the status of an itinerary. For example, an itinerary can be put "on hold" by disabling it, or can be terminated by signaling an SSR to delete the identified itinerary.

As will be apparent to those skilled in the art, additional message types and corresponding contents may be useful for other purposes not detailed here. As an example, an SA can be provided with a means for re-learning the details of the itineraries scheduled in each or every SSR in the network domain (a Schedule Report Request), or for obtaining details of an interface (an Interface Information Request).

Furthermore, where dealing with a multi-domain scheduled network environment, additional parameters may be included in a flow request message. Such a message may usefully include information related to: estimated hops, branching factor, distance since last branch, outbound appointment set, and (optionally) a phase shift window. In addition, where the SA functions are carried out in a distributed mechanism, a variation of the NSP may be created for robust exchange of topology and schedule information between domains.

Although the illustrative embodiment of the NSP has been described has having particular content or features, those skilled in the art will recognize that equivalent features and functions could be implemented by various other constructs. In particular, the NSP described is by no means intended to restrict other means for implementation of a suitable NSP for carrying out the essential functions of the RTNSPRS, as described, or equivalents thereof.

Brief Description of Predictive Network Scheduling

As previously documented, the current disclosure describes an invention that pre-schedules a synchronized flow of data packets through any number of links within any number of data packet switches such that bandwidth is guaranteed and network transport delay is deterministic. The extensibility of the current invention is limited only by the capacity and performance of the SA computer(s). Thus, when a transmitting endpoint requests a connection to a designated receiving endpoint, the SA as described herein will command the switches to establish a distinguished path through the topology of the network.

A path is distinguished in three dimensions; by (1) "Best Available" for the current requested session, (2) by scheduled arrival times at each of the links for designated data packets, and (3) by association of a particular time schedule with a particular packet flow.

When a network path is requested, the software components of the currently disclosed invention will examine the current state of the available itineraries between the requesting network endpoints to determine the "best" available circuit paths that can be established between the two end points, i.e., an "itinerary" that would be acceptable for the purpose. In this context, "best itinerary" can be defined by any number of metrics necessary to make such a decision. For example, the SA may consider factors such as geographic distance between switches, current load, link speed, shortest or longest circuit delay, time of day, day of week, cultural holidays, or any other data that may be important to effectively reserve a scheduled packet flow.

A unique aspect of the current invention is that data paths and schedules within those paths may be chosen and constructed to more efficiently respond to future heavy load periods. For example, if the SA has current or historical data that indicates that a switch located in a particular geographic location becomes a bottleneck at particular times of the day, the Schedule Agent can choose to minimize immediate use of the switch by routing packets through other switches in anticipation of an upcoming busy period. Thus, the SA can choose to sub-optimize the current path selection in order to minimize any blocking effects that could be caused by non-predictive scheduling.

Detailed Description of the Packet Scheduling Architecture

Figure 5:
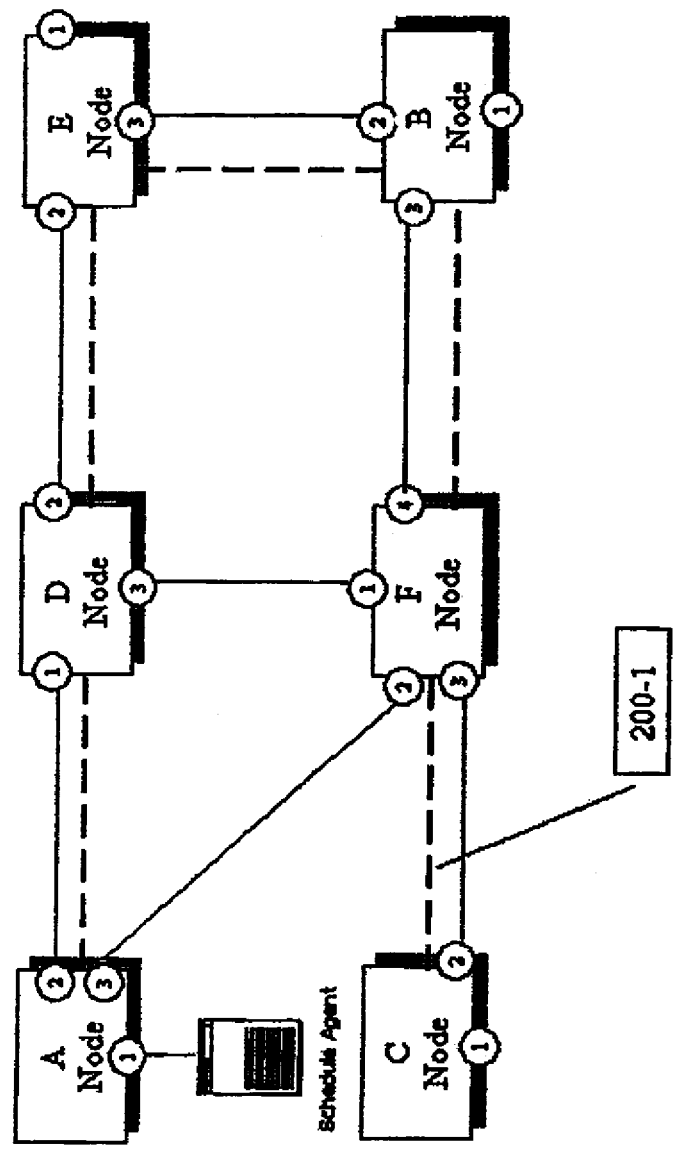
FIG. 5 shows a typical six node network of Scheduled Switches. The dotted line represents the heartbeat signal that is used to coordinate all of the nodes so they may operate synchronously to a common time reference.

FIG. 5 illustrates a simple network. The switch nodes in the network are labeled A, B, C, D, E, and F. For a scheduled network, a Digital Communications Processor communications processor within each of the switches maintains a constantly recurring 20 millisecond schedule of appointments for each of the links within the switches (note that other schedule periods could be implemented). Each of the appointments is a placeholder for a data packet. Note that each of the switches can be synchronized to a common clocking mechanism by way of a recurring heartbeat signal (200-1). Thus, all of the links within the switches are cycling, in "lock-step", through their appointment schedules, they are all working on the same appointment number (or more precisely, the same offset within the appointment schedules, because links of different speeds will have a different number of appointments given the same schedule period and appointment size.). For example, if within the global system-wide 20 millisecond period, if a given link's recurring appointment schedule is offset to appointment #98, then all links operating at the same speed and within the same system are offset to appointment #98. A link operating at, e.g., twice the speed of the given link but with the same schedule period and appointment size will be offset to appointment #196.

Alternatively, instead of using "lock-step" synchronization, the system can be adapted to use relative timing between schedules which are not in lock-step synchronization, e.g., when one link's schedule offset is appointment #98, other same-speed links' offsets could be different. Relaxing the lock-step synchronization constraint is useful in practice because it reduces complexity and it assists in handling asymmetric propagation delay for some individual links (e.g., links in SONET rings) and in recovery from link outages. In lockstep synchronization, the heartbeat signal is used to synchronize the schedule periods of multiple links, i.e., to ensure that the links' processing logics are all on the same offset within their schedules. Heartbeats also function as the mechanism to ensure that small differences in internal clocking precision between different links are corrected such that, on average, all links schedule periods are the same with high precision. In a relatively-timed system, heartbeat signals are used to not only ensure that schedule periods are accurate with high precision but also to compute the differences between offsets between adjacent links. The SA uses this difference information to compute link transport delays between SSRs, which are then incorporated into the tumbler algorithm. The relative timing mechanism is described in the reference P. Sprague, D. Wisler, Relative Timing: A Solution for Asymmetric Propagation Delay, unpublished paper of Cetacean Networks, 100 Arboreturn Drive, Portsmouth, N.H. 03801, which is hereby incorporated by reference herein in its entirety.

Given lock-step or relatively-timed synchronized operation, the SA will cause the communications processors within the switches to earmark a particular appointment for a particular stream of future data packets. Conversely, the SA computer will also tear down a particular schedule of appointments when its session is ended. In normal operation, the various links may be of different speeds, more loaded than others, or simply down due to hardware failure. Given these criteria, it is the responsibility of the SA to find and assign virtual circuits, or data paths, through the switch such that the two or more requesting end points are accommodated with a complete itinerary of scheduled appointments. The path through each SSR is realized by using the precise arrival time for a packet on an ingress port as an index in a forwarding table to a selected transmission time for the same packet on an egress port for transmission. Once the table is populated for a given itinerary, every packet in the corresponding flow, arriving on the ingress port at the designated arrival time (appointment) will be shunted across the switch and transmitted at the designated departure time on the egress port. Given that the Schedule Agent has total knowledge of the state (reserved or open) of each of the appointment assignments for each of the links within the network, the SA can analyze the network to look for a series of appointments that can be reserved such that a packet can traverse the network from endpoint to endpoint in a totally scheduled and therefore deterministic manner.

It is immediately obvious that the number of appointments allocated to each link's schedule interval is directly related to the effective data rate of the associated link. Table 201 lists the number of appointments available for different media types, according to one embodiment of the invention. Note that this table assumes a 250-byte appointment and a 20 mSec period. Those skilled in the art will observe that other appointment sizes and or schedule periods may be used in order to meet other communication requirements.

TABLE 201

Figure 6:
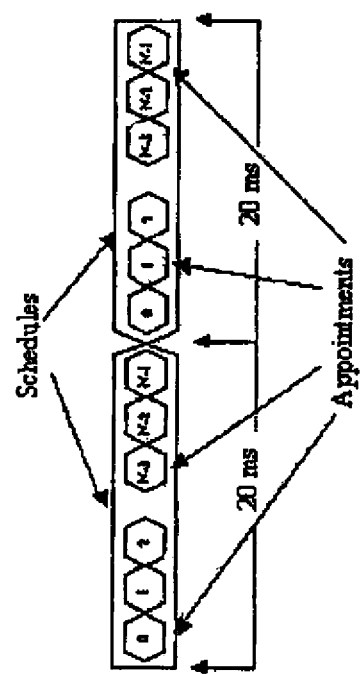
FIG. 6 shows the construction of an appointment schedule used within by the Scheduled Switch. The illustration shows two 20-millisecond schedules of appointments.
Figure 7:
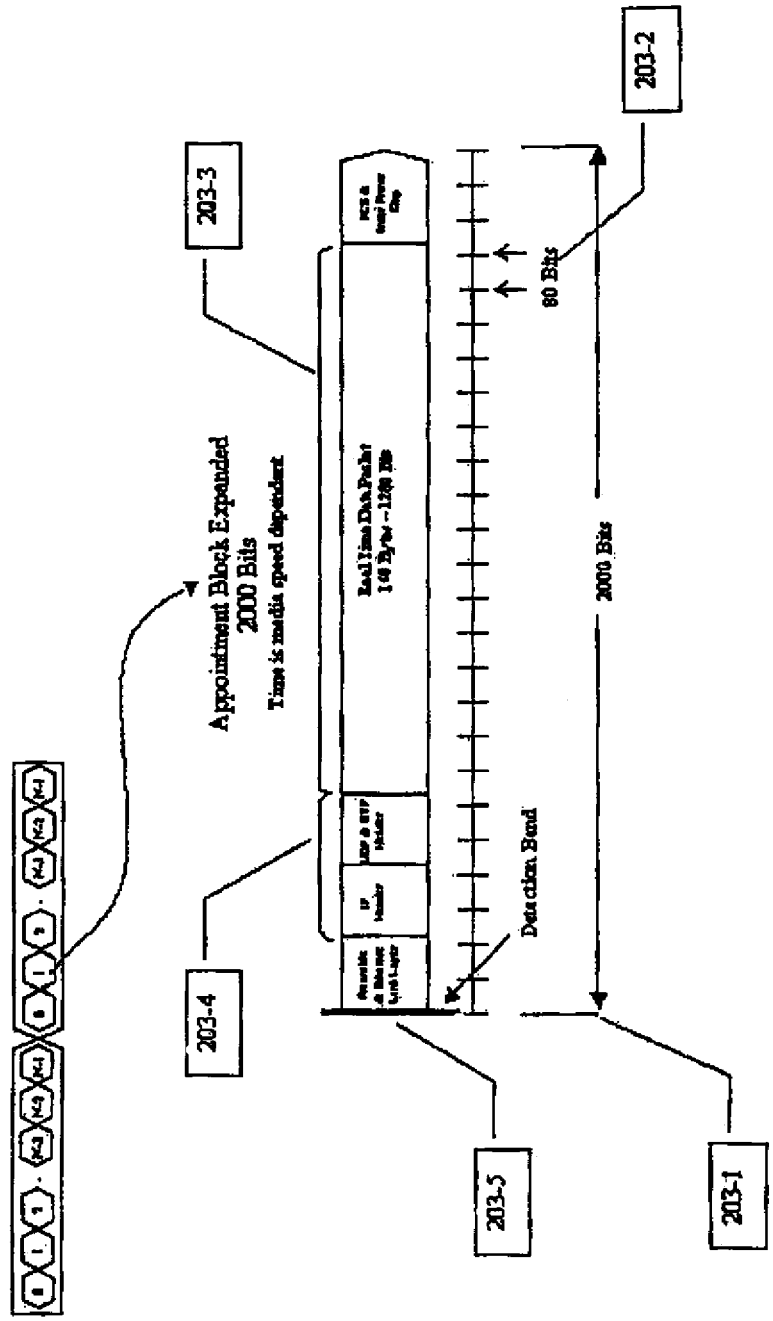
FIG. 7 illustrates the detailed construction of a single appointment consisting of, a Detection Band, IP, UDP, and RTP Headers, Real Time Data Packet, and the FCS and Interframe gap.

FIG. 6 and FIG. 7 illustrate the detailed structure of an appointment schedule.

| Link Type | Full Data Rate (Megabit) | Usable Data Rate (Megabit) | Number Appointments |
|---|---|---|---|
| T-1/DS 1 | 1.544 | 1.536 | 15 |
| E-1 | 2.048 | 1.920 | 19 |
| T-3/DS-3 | 44.736 | 43.0 | 430 |
| 10Base-T | 10.0 | 10 | 100 |
| 100Base-T | 100.0 | 100 | 1,000 |
| 1000Base-F | 1000.0 | 1000 | 10,000 |
| Sonet/OC-1 | 51.840 | 43.0 | 430 |
| OC-3 | 155.52 | 129.0 | 1,290 |
| OC-12 | 622.08 | 516.1 | 5,160 |
| OC-24 | 1,244.2 | 1032.2 | 10,322 |
| OC-48 | 2,488.3 | 2,064.4 | 20,644 |
| OC-96 | 4,976.6 | 4,128.8 | 21,288 |
| OC-192 | 9,953.3 | 8,257.6 | 82,576 |
| OC-256 | 13,271.0 | 11,010.0 | 110,100 |

All of this information is pulled together and shown in FIG. 7, which shows the relationship between time, schedules and appointments.

The top part of the figure shows two consecutive 20-millisecond schedules. Inside each schedule are shown N appointments, numbered 0 to N−1. If a particular flow is given an appointment slot on any link, it has that appointment for all schedules until that flow is terminated. The number of appointments in a schedule from 0 to n−1 is equivalent to its respective link entry in Table 201.

FIG. 7 shows an expanded view of an individual appointment. The appointment is shown as a stream of 250 bytes of data (2000 bits) with the leftmost bit (203-1) being the first on the network. The hash marks give markings in 80 bit (10 byte) increments (203-2). This appointment is shown with 160 bytes (1280 bits) of application data (203-3). For flexibility, an appointment is designed such that it can have as little as 46 bytes (368 bits) of data. Note that 172 bytes of data would exactly match the maximum size of 250 bytes (payload plus the headers, jitter and detection overhead bits); however there must be some space (2 bits) reserved for jitter and some space (2 bits) for the detection band. The current disclosure reserves 10 bits, which is rounded to 2 bytes (16 bits). This sets the maximum limit on a single appointment size to 170-bytes of application data. If a data packet exceeds the 250-byte limit (application data and overhead), it will spill over into another appointment.

The maximum IP limit is 1500 bytes for an IP packet. This allows 1460 bytes for real time traffic (taking out the 40 bytes reserved for IP, UDP, and RTP headers). Assuming Ethernet, a full size packet would span 1538 bytes, or 7 appointments. Therefore, a real time stream that used maximum IP packets and had only a single itinerary could stream 73,000 bytes per second.

To facilitate architectural extensibility and accommodate current market trends toward large packet sizes, the design supports packets that exceed the 1500 byte limit. There is market evidence that some applications require 9000 byte packets. The 9000 byte packets would require 37 contiguous appointments and could stream 448,000 bytes per second. Doing a multi-part stream, with groups of 5 appointments per stream, each appointment would allow 1170 bytes of application data. A 10Base-T network would (with 100 appointments) stream 1.17 megabytes per second. This is adequate to support 1 or 2 compressed video channels, 2 phone channels, and about 150 K bits/sec data channel.

Note that at the far left side of the appointment block is a line labeled Detection Band (203-5). This band is very narrow (roughly 10 bit times for 10Base-T, 20-40 bit times for faster connections). If the scheduled appointment data does not arrive during that detection band, then the scheduled traffic is declared dropped for that particular appointment/schedule time. Thus, there will be no traffic forwarded to the follow on appointment. Therefore, the missed appointment, for this schedule period only, is available for unscheduled traffic.

To transmit unscheduled traffic over a scheduled appointment, the switch waits until the Detection Band has expired. It can then transmit the unscheduled traffic over that link. The link down stream that receives this packet will know it is unscheduled traffic since it started to arrive after the detection band period. Thus it is possible to send unscheduled traffic over lightly used appointment times as well as over unused appointment times.

Description of the Packet Scheduling Software

There are three primary software modules that interoperate with each other and with the Scheduled Switch hardware to implement the current disclosed invention: The Path Generation Engine, the Admissions Engine, and the Tumbler Scheduling Engine.

The Path Generation Engine (PGE) is responsible for generating the matrix of possible connection paths for the entire network topology. It may do this generation via a manually generated database or by discovery of the network topology via communications with the Scheduled Switch Hardware. Additionally, if the topology changes for some reason (i.e., reconfiguration by the user, hardware failure or network management), the PGE will update its database so that the Admissions Engine (AE) and the Tumbler Scheduling Engine (TSE) remain synchronized with the current configuration of the network topology. FIG. 16 shows the algorithm flowchart.

The AE is responsible for filtering the candidate paths from the PGE. Various criteria such as link speed can be used to make a determination as to which candidates to pass to the TSE. The TSE is responsible for assigning a specific schedule through the network.

Detailed Description of the Tumbler Scheduling Algorithm

Figure 8:
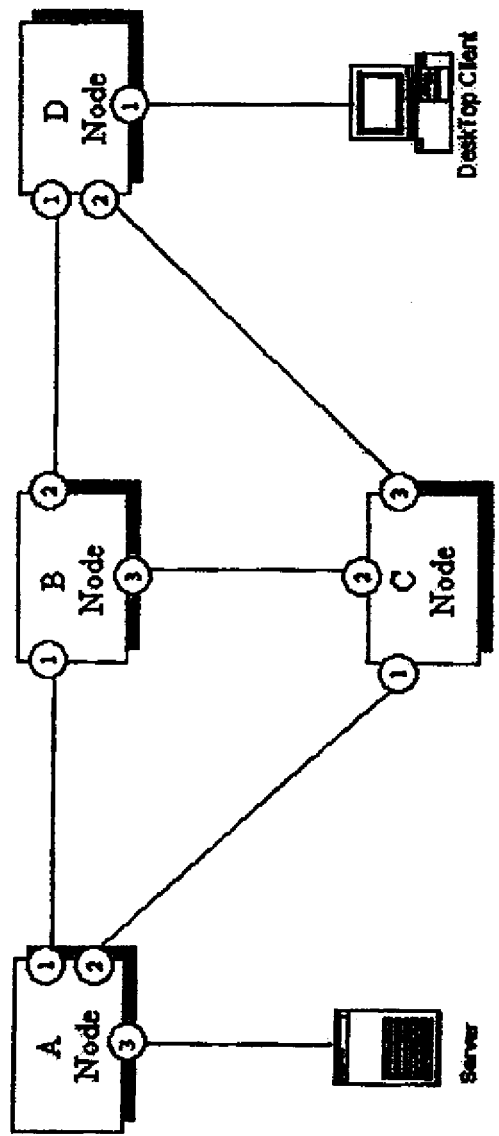
FIG. 8 shows a basic network of Scheduled Switches each with three links that will be used to send and receive data packets as they progress through the network. This illustration will serve as an example for a step-by-step description of the packet-scheduling software.

Referring to FIG. 8, the simple network matrix represents a scheduled switch network. To setup a circuit (itinerary), with a requested time path from node C to node E, the following algorithm is disclosed:

For the example network FIG. 8 (Switches A, B, C, D, E, and F), the possible connections for the network are shown in Table 301. As can be seen by comparing the Example Topology with the Matrix, Node A has three possible links (A1, A2, A3). For this example, A1 is assumed to be an ingress point for a Scheduled Endpoint network device while A2 and A3 are connected to D1 and F2 respectively. The full connection scheme is seen by examining the matrix in Table 301 where the "?" entry designates a connection between the two links.

Once an endpoint requests a connection to another endpoint(s), the PGE examines its connection data and passes the path mapping data to the Tumbler Scheduling Engine (TSE) via the Admissions Engine (AE). In practice the PGE may have many possible paths that can be used to connect one endpoint to another. In this case it will present such candidate paths based on a specific set of criteria if so desired as enforced by the AE. Any set of heuristic data can be used to prejudice the selection of path data.

Figure 10:
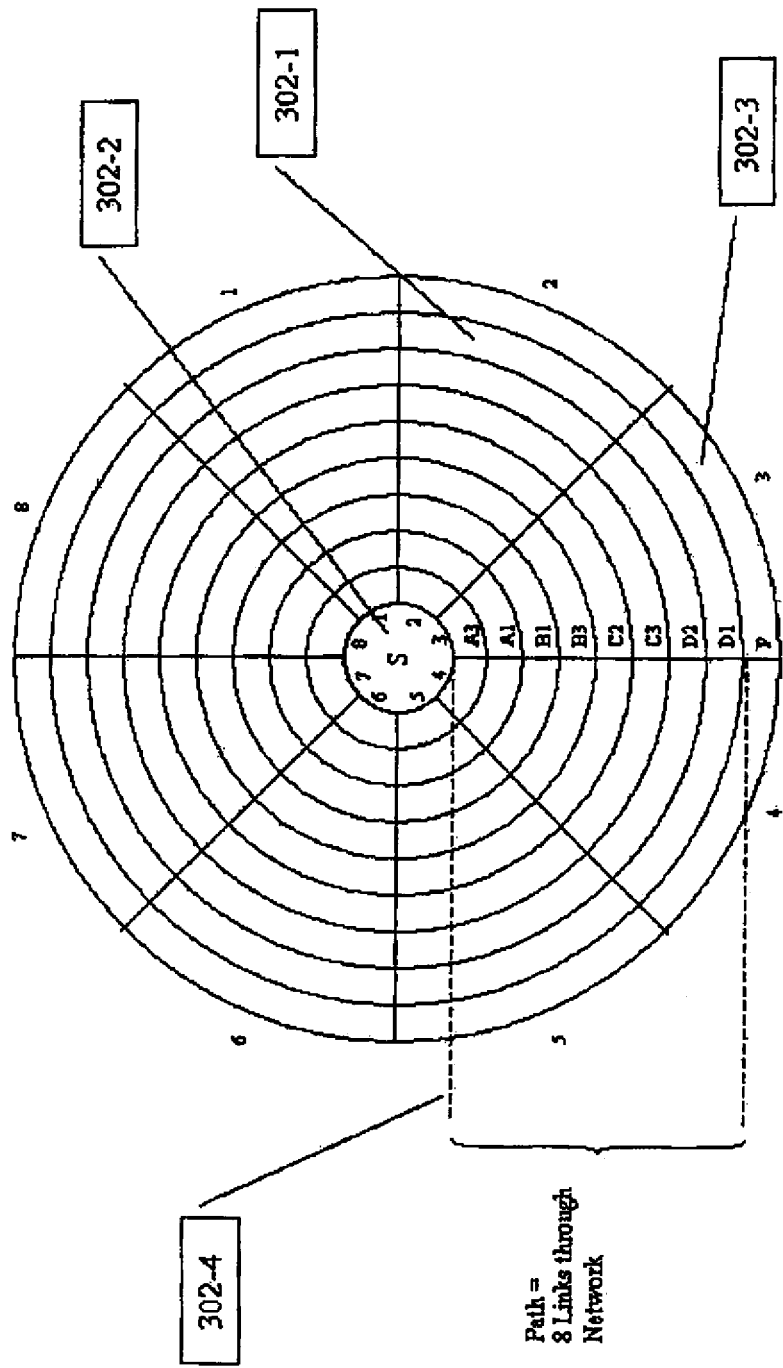
FIG. 10 shows an exemplary circularly linked data structure representing a tumbler algorithm according to an illustrative embodiment of the present invention.

Referring to FIG. 10, the mechanism used to control the Scheduled Switch hardware is best visualized as a set of concentric rings, with each ring representing the schedule of appointments for a particular link. During the Path Search process, the rings will be turned (via software) until a contiguous set of free appointments is found for the candidate path submitted by the AE. The operation is similar to that of a combination lock, hence the reference to a Tumbler. The spaces in the rings represent the schedule appointments. For example the space at ring segment D1-2 (302-1) represents the second appointment period for Link D1. Although there are only eight appointments represented in the example, there can be thousands in actual practice, depending on the link speed. Again refer to table 301 for the number of appointments required for each type of link.

Again referring to FIG. 8, if we assume for this example that the Server (S) desires to establish a one-way path to the PC (P), a Tumbler map is set up by the Software as illustrated by FIG. 10. Note the starting endpoint is assigned a schedule as indicated by the center ring (302-2) and the receiving endpoint is designated by P (302-3). Every link within the switch hardware is assigned its own schedule circle that will store the state of each appointment within the schedule period (302-4). Thus, FIG. 10 shows a scheduling tumbler mechanism with schedule circles for links Endpoint S, A3, A1, B1, B3, C2, C3, D2, D1, and Endpoint P. There are no appointments reserved in this example. Note that at each of the specific appointment times within the 20 millisecond schedule period, the link can be either transmitting or receiving the data packet assigned to that appointment time. Once a scheduled path is assigned to the end points, (called an itinerary) the Scheduled Switch hardware will enforce the data packet schedule for each of the links.

The number of "tumbler" rings necessary for a path is directly related to the number of links between the Scheduled Endpoint network devices (302-4 and Table 301 FIG. 9).

To those schooled in the art of synchronized state machines, it should be apparent that a scheduled network, synchronized to a common time reference, will now exhibit totally deterministic behavior. This is the case because from the first to last data packet transferred between the endpoints, their packets will occupy the exact time period (schedule) for each of the links throughout the path. Additionally, it can be seen that even when a link is receiving or forwarding packets from other endpoints, the packets that have reservations in different appointment slots remain unaffected.

The circular nature of the data structure of course shows that the schedule recurs in time every 20 milliseconds. If a link is occupied for a particular appointment increment, the increment is marked on the schedule ring.

Again referring to FIG. 10, the actual software implementation for the Tumbler algorithm uses circularly linked data structures within the SA computer. The circular tables represent a repeating schedule, which is chosen as 20 milliseconds for this particular implementation, although the time period can be changed for different types of network uses.

To determine if a time path can be found along a set of connected links, the schedule rings are placed around their neighbor going from source outward to destination. See FIG. 10. The start point of the path from S to P is the schedule ring for S. This is surrounded by its next hop in the path, A3, and so on with the final destination link between D1 and P, our destination.

Figure 11A:
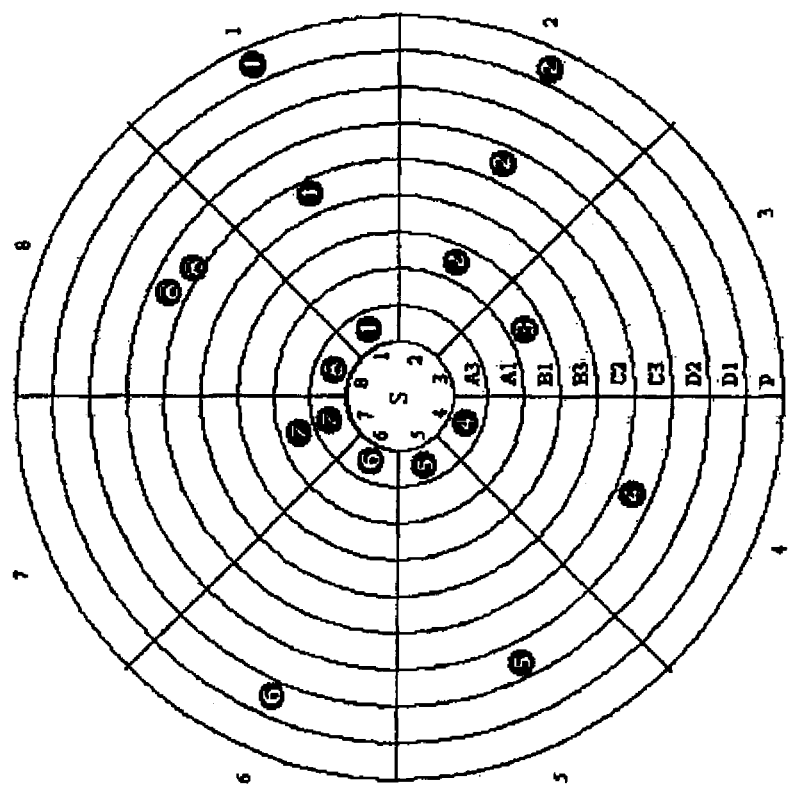
FIGS. 11A-E illustrate the use of an exemplary circularly linked data structure as a tumbler mechanism to schedule appointments in a particular path through a network according to an illustrative embodiment of the present invention.
Figure 11B:
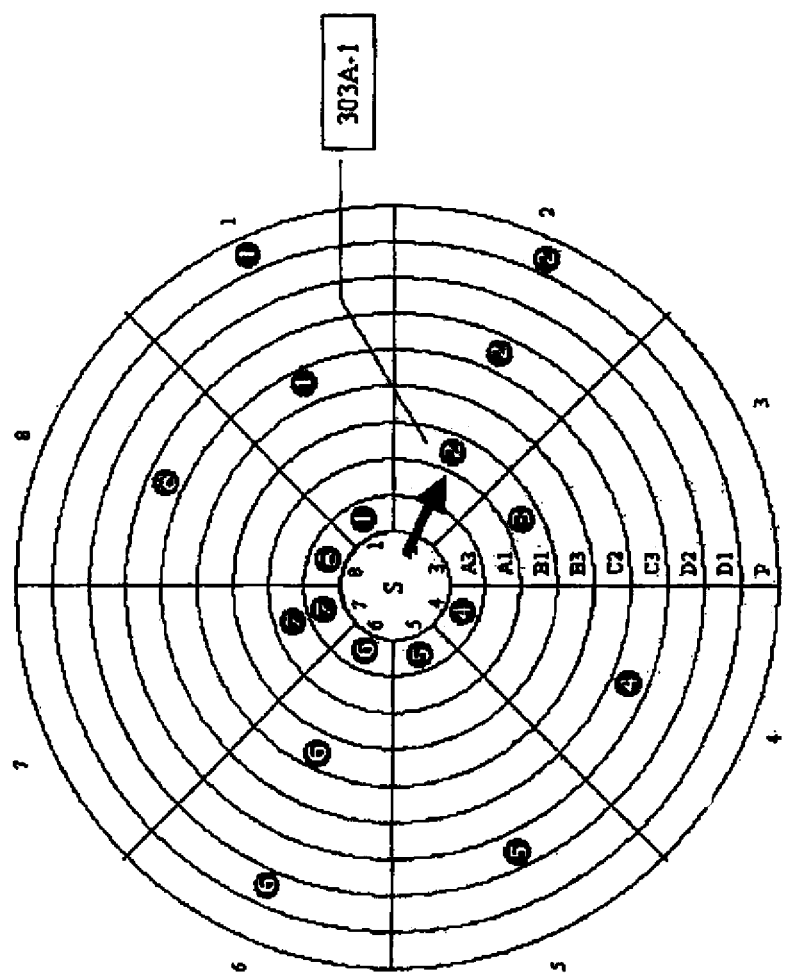
Figure 11C:
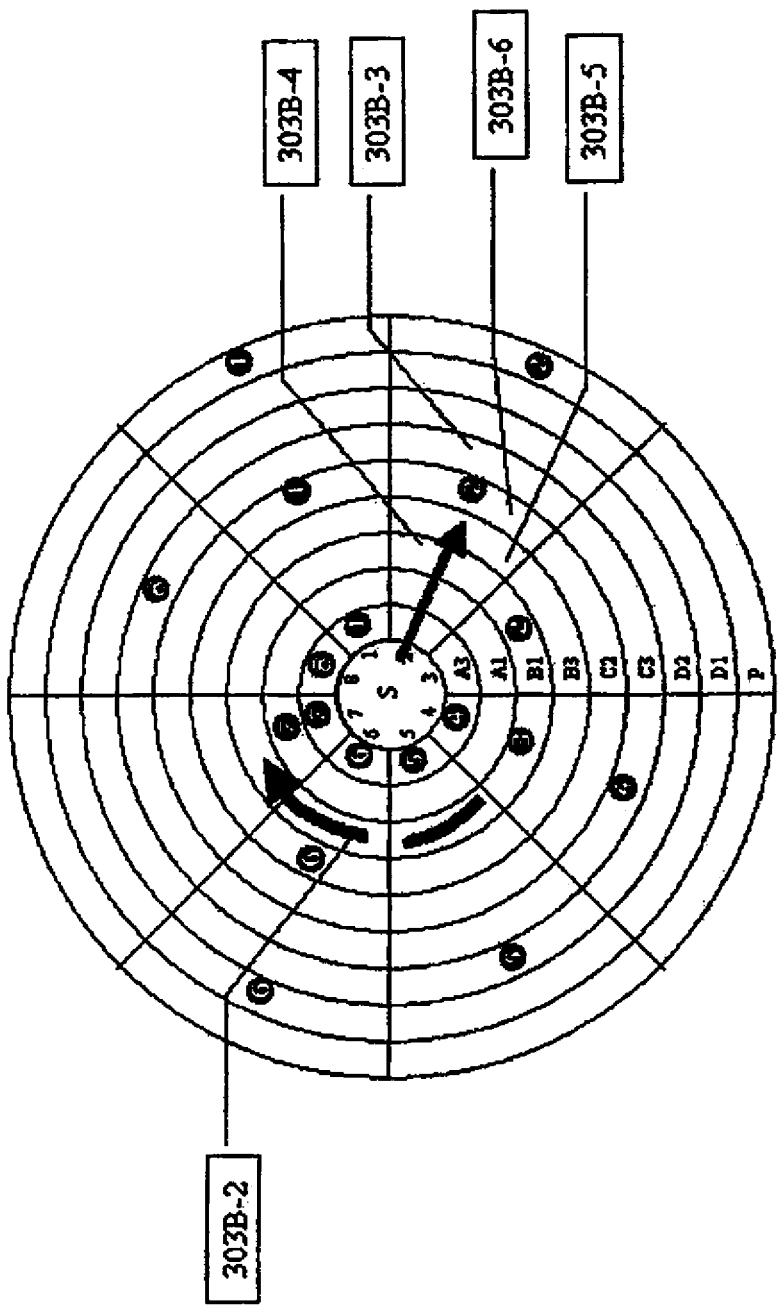
Figure 11D:
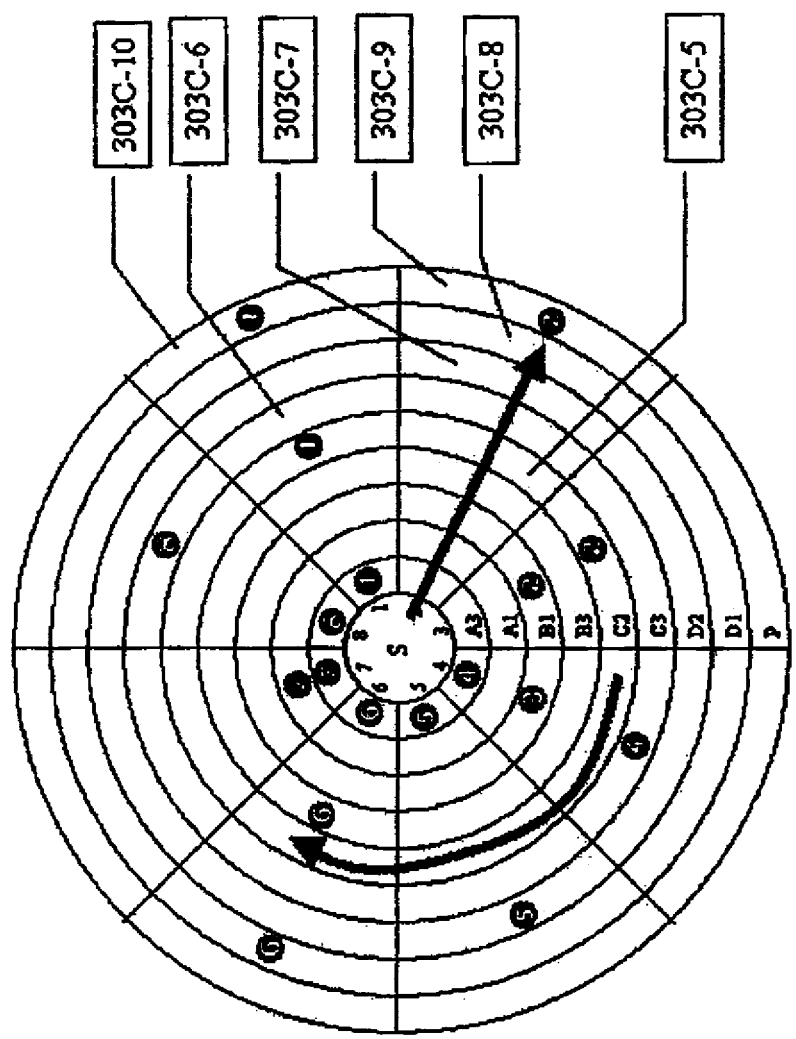
Figure 11E:
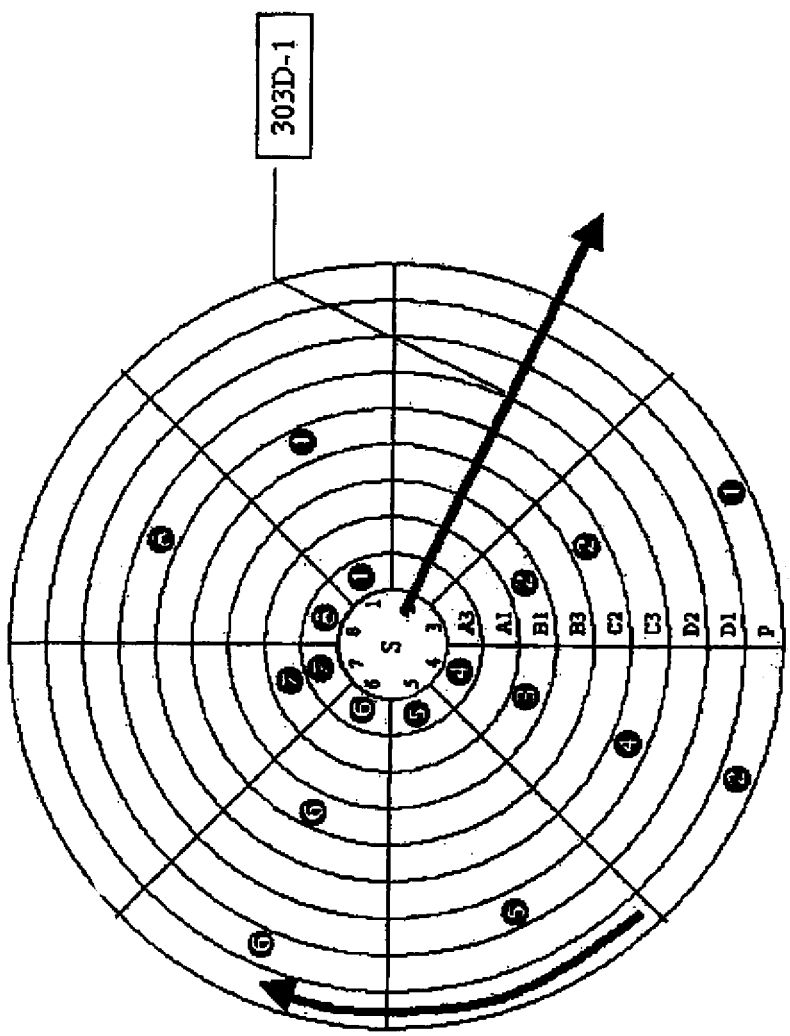

Assume that S has requested a scheduled path to P. The PGE proposes the path as indicated by the circular ring set indicated in FIGS. 11A-E. Note that in this case, there are appointments already reserved within each of the individual link schedules. Observe that in its initial state there is no clear path from the inner circle (S) to the outer circle (P). Thus, the map shows what all the links are doing at each schedule increment, but does not show how to find a path through the scheduled increments. To find the scheduled path, the following algorithm is disclosed:

1. Noting that in the current map, the S schedule is totally free and the next link is A3 with two open appointments,
2. Starting at A3-2 we note an open appointment. Jumping to the next ring we note that A1-2 is also an open appointment. We now have appointments in 2 of the 8 links needed to complete the requested scheduled path. Note the path designation arrow can move two links (A3 and A1) but is blocked by B1-2 (FIG. 11B, 303A-1).
3. Because B1-2 (303A-1) is reserved by another packet itinerary, the software will now rotate the circular table to the next earlier appointment (B1-1) on FIGS. 11A-11E. It is noted that this appointment (B1-1) is free (FIG. 11C, 303B-4). At this point we have 3 of the 8 links needed to complete the requested scheduled path.
4. The algorithm can now advance its path indicator to the next link B3-2 (303B-5) which is found to have an open appointment. At this point we have 4 of the 8 links needed to complete the requested scheduled path. The algorithm can now advance its path indicator to the next link C2-2 (303B-6)
5. We note that C2-2 is reserved so the algorithm will rotate the schedule to the next earlier appointment C2-1 (FIG. 11D, 303C-5). We note that C2-1 is free. The path indicator can be advanced to C3-2 (303C-6). At this point we have 5 of the 8 links needed to complete the requested scheduled path.
6. We note that C3-2 (303C-6) is a free appointment. The path indicator can be advanced to D2-2 (303C-7). At this point we have 6 of the 8 links needed to complete the requested scheduled path.
7. We note that D2-2 (303C-7) is a free appointment. The path indicator can be advanced to D2-2 (303C-7). At this point we have 7 of the 8 links. The path indicator can be advanced to D1-1 (303C-8).
8. We note that D1-1 (303C-8) is a free appointment. The path indicator can be advanced to P (303C-9). At this point we have 8 of the 8 links. The path indicator can be advanced to D1-1 (303C-8).
9. At this point we have all of the Scheduled Switch links earmarked for a final reservation but as can be seen at 303C-9, the number 2 reservation for this particular Scheduled Endpoint is reserved. This would most likely happen on a multi-tasking computer where a single network interface card is shared by two or more applications.
10. Since P2 is blocking the completion of the path, the schedule ring for P is rotated to the next previous appointment which is P1-1 (303C-10). We note that this appointment is also reserved. The algorithm again rotates to the next previous appointment P-8, which is found to be free.
11. Referring to FIGS. 11A-11E, we now have a complete path, indicated by the path indicator (FIG. 11E, 303D-1) going from the Starting point S through nodes A3-2. A1-2, B1-3, B3-2, C2-3, C3-2, D2-2, D1-2, and P-8.
12. At this point, the SA will send a reservation command to each of the switches to reserve the specific appointment times in each of the specific links, in effect publishing the itinerary to each affected device.

Figure 17:
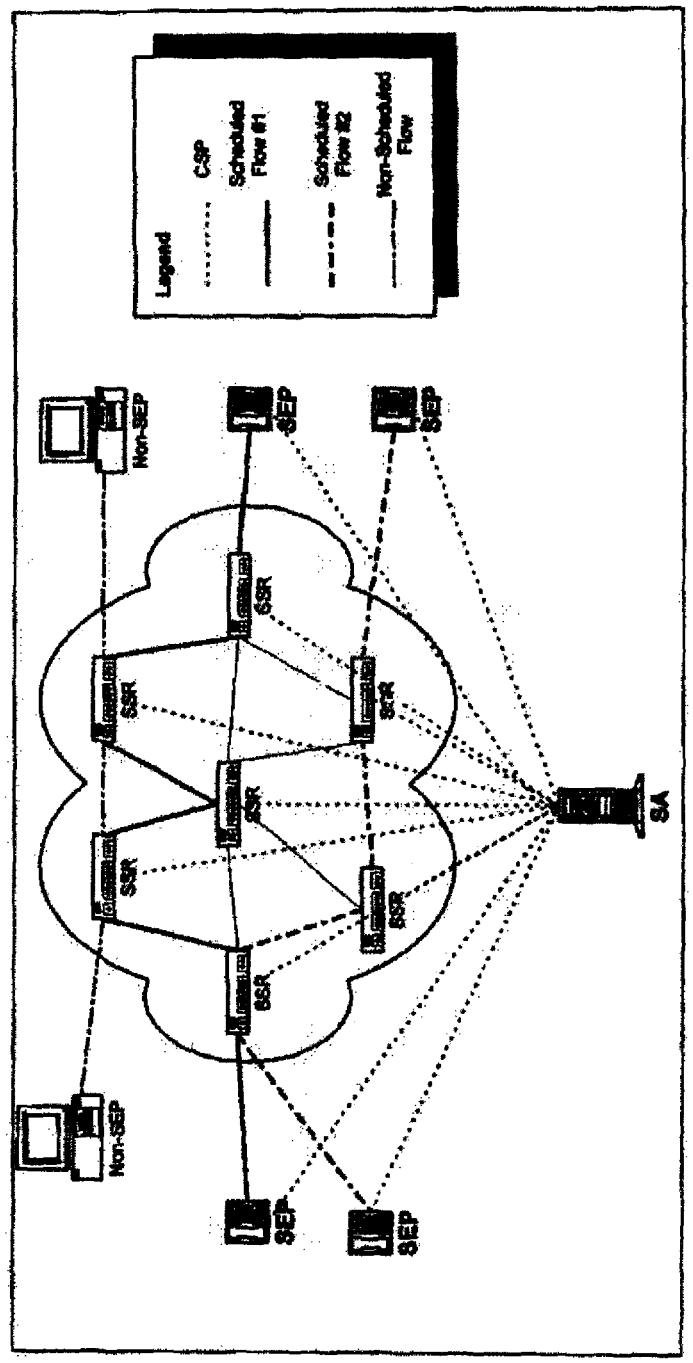
FIG. 17 illustrates an example of a scheduled network in operation.

FIG. 17 illustrates an example of a scheduled network in operation. SEP and Non-SEP devices are attached to the network. The network is comprised of SSRs attached to each other to form physical paths between SEPs and Non-SEPs. An SA communicates with each SSR and each SEP via the Network Scheduling Protocol (NSP), as indicated by the dotted lines. The SA does not communicate with any Non-SEP. Non-scheduled flows are carried by the SSRs in the network between the Non-SEP devices, as shown by the light dashed lines between the network and the two Non-SEPs. As described above, Scheduled flows are arranged between SEPs by the SA and communicated to each SEP and the relevant SSRs via the NSP channels. Scheduled Flow #1 is illustrated by the heavy line from one SEP to an SSR on the near edge of the network, across four other SSRs and connecting to another SEP from the SSR on the far edge of the network. A second Scheduled Flow #2 is illustrated by the heavy dashed line from the lower left-hand SEP to the network, across three SSRs in the network, and connecting to the lower-right-hand SEP. As described earlier, the SSRs can be configured to always attempt to route unscheduled IP traffic independent of the SA, using open (unscheduled) appointments available between Non-SEPs. Each of these unscheduled flows, and multiple scheduled flows, may operate independent of each other, according to the available resources and itineraries available for sharing within the network.

Once a path has been scheduled, it is maintained by the Scheduled Switch until such time as an endpoint ends the session or an error condition is detected. When an end of session is requested, the SA will retrieve the itinerary from its database and issue a teardown command to the Scheduled Switches, which will then release the reserved appointments. FIG. 15 shows the flowchart for the Tumbler Scheduler Algorithm.

While the above disclosed software algorithm, in cooperation with the Scheduled Switch Hardware, will find and schedule a path through the network, there is no compensation for the delays that exist within each Scheduled Switch when going from link to link, or for the transmission delays when moving from switch to switch.

Figure 12:
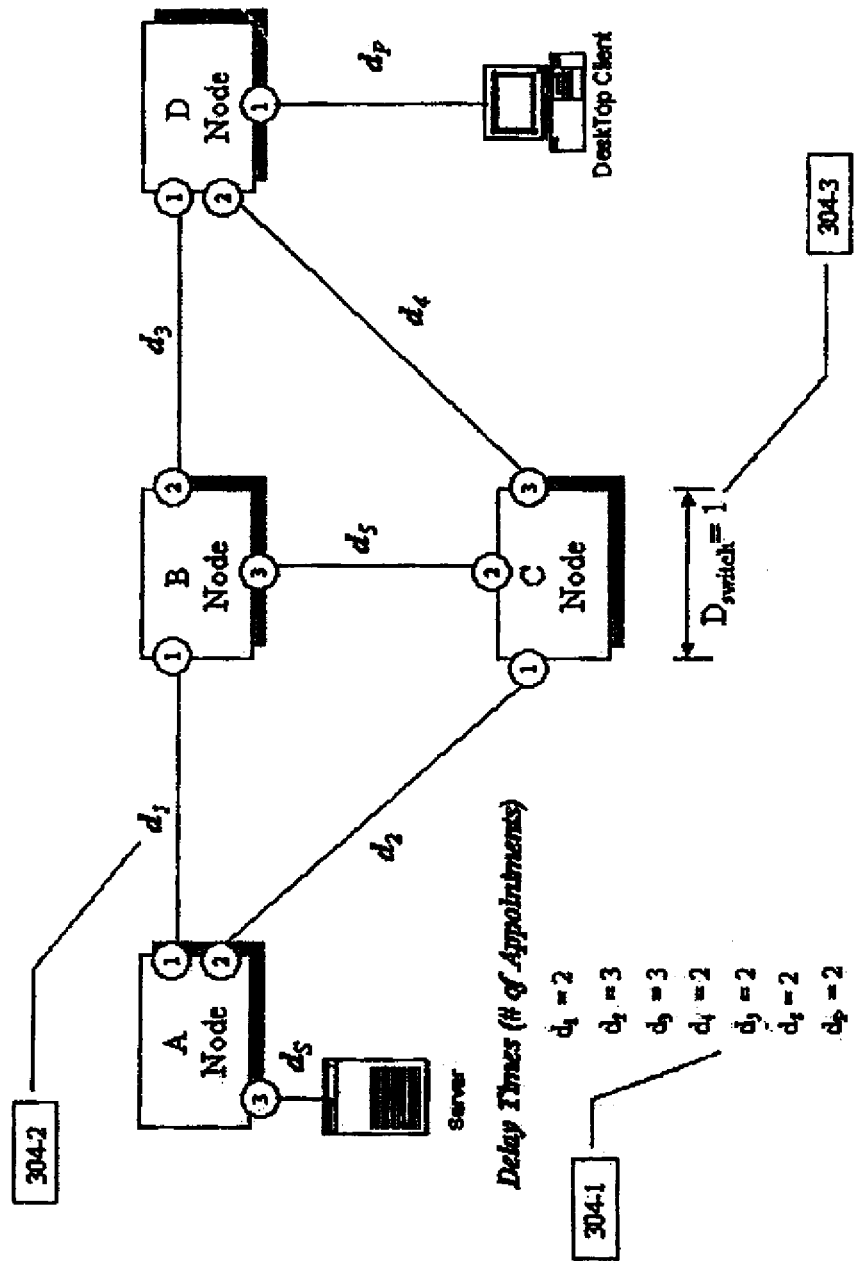
FIG. 12 shows an exemplary configuration of switches with indicated transmission delays and latency delays through the switches according to an illustrative embodiment of the invention.

FIG. 12 shows the same configuration of switches used for the disclosure of the Tumbler Scheduler Algorithm with the added reality of transmission delays and latency delays through the switches. The actual delays are as indicated on the connectors between the switches and referenced to the table of delay times (304-1) associated with each transmission line plus the latency delay within the switch. For example delay $d_1$ (304-2) is the delay, in appointment times associated with the transmission line from A1 to B1. Referencing $d_1$ in the table (304-1) shows that the transmission delay from A1 to B1 is equivalent to 2 appointment times. Note also that the latency involved when a packet moves through a switch is indicated as $d_{switch}$ (304-3) (for example from C1 to C3) is assumed to be equivalent to 1 appointment time for these speed links.

Figure 13:
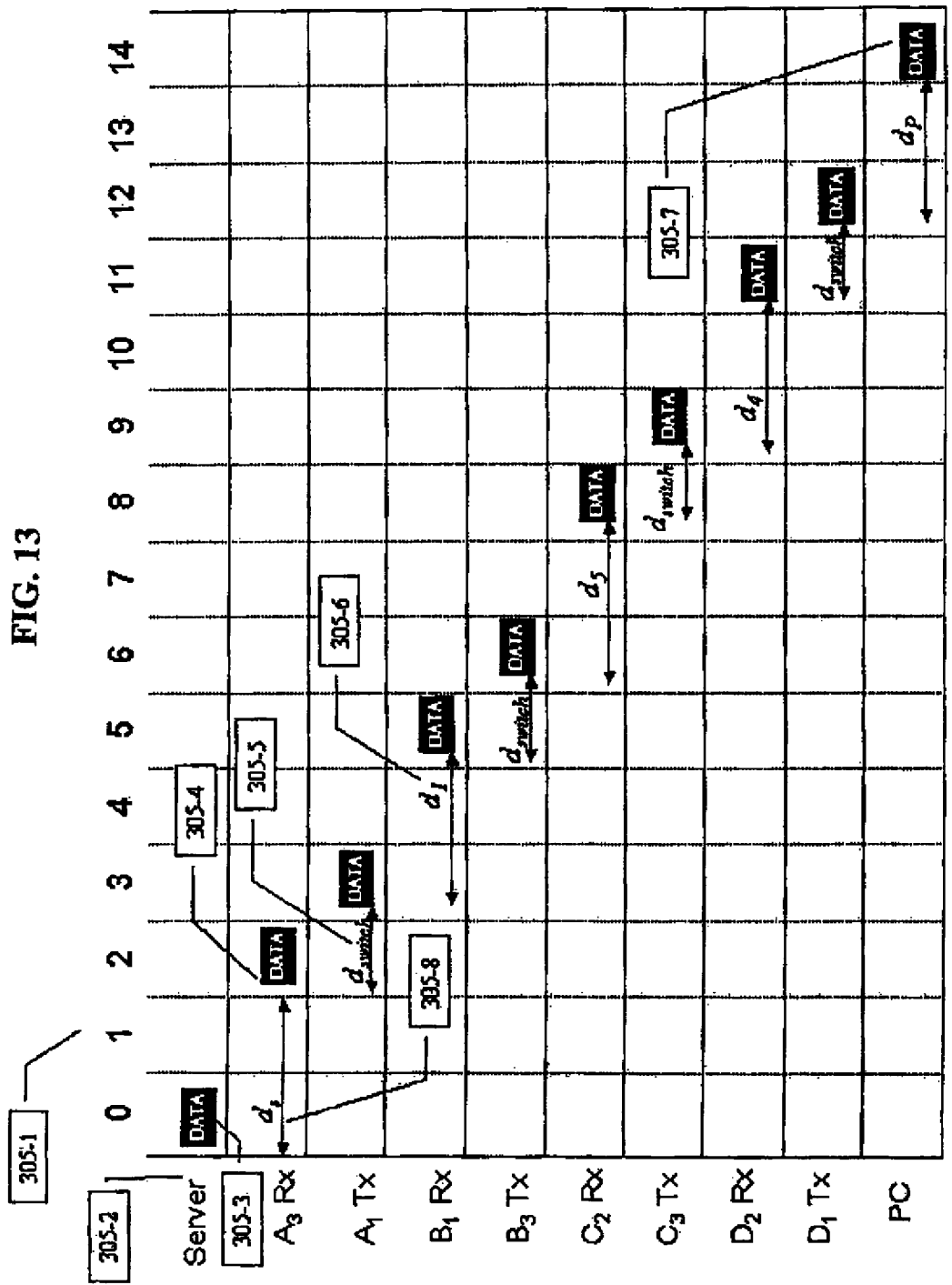
FIG. 13 shows an example of the movement of a data packet indicating transmission delays and switch delays referenced to clock times represented by the columns as the data packet traverses through a particular path through a network according to an illustrative embodiment of the invention.

FIG. 13 shows the placement of a single packet as it traverses through the grid of link appointments referenced against clock times represented by the columns numbered 0 through 14 (305-1). Referencing FIG. 12 for the respective link delay times, Server (305-2) starts transmission of its packet at the beginning of time 0 arriving at $A_3$ RX at time slot 2 (305-4). The packet then experiences latency delay ($d_{switch}$) while forwarded by $A_3$ RX to $A_1$ RX (305-5) within the switch. $A_1$ RX in turns forwards the packet to $B_1$ RX experiencing the delay $d_1$ (2 appointment times) before it starts to arrive at the beginning of time slot 5 (305-6). This process can be followed through to the destination PC (305-7) at time slot 13.

Remembering that the links are cycling through their appointment schedules in lock-step, where all are working the same appointment number, a problem can be seen at the first delay point, $d_s$, (305-8) where, during the delay period of 2 appointment times, the appointment cycle has moved two appointment times past where the SAs Tumbler Scheduling Algorithm believes it should be. This problem occurs at every point of delay.

Figure 14:
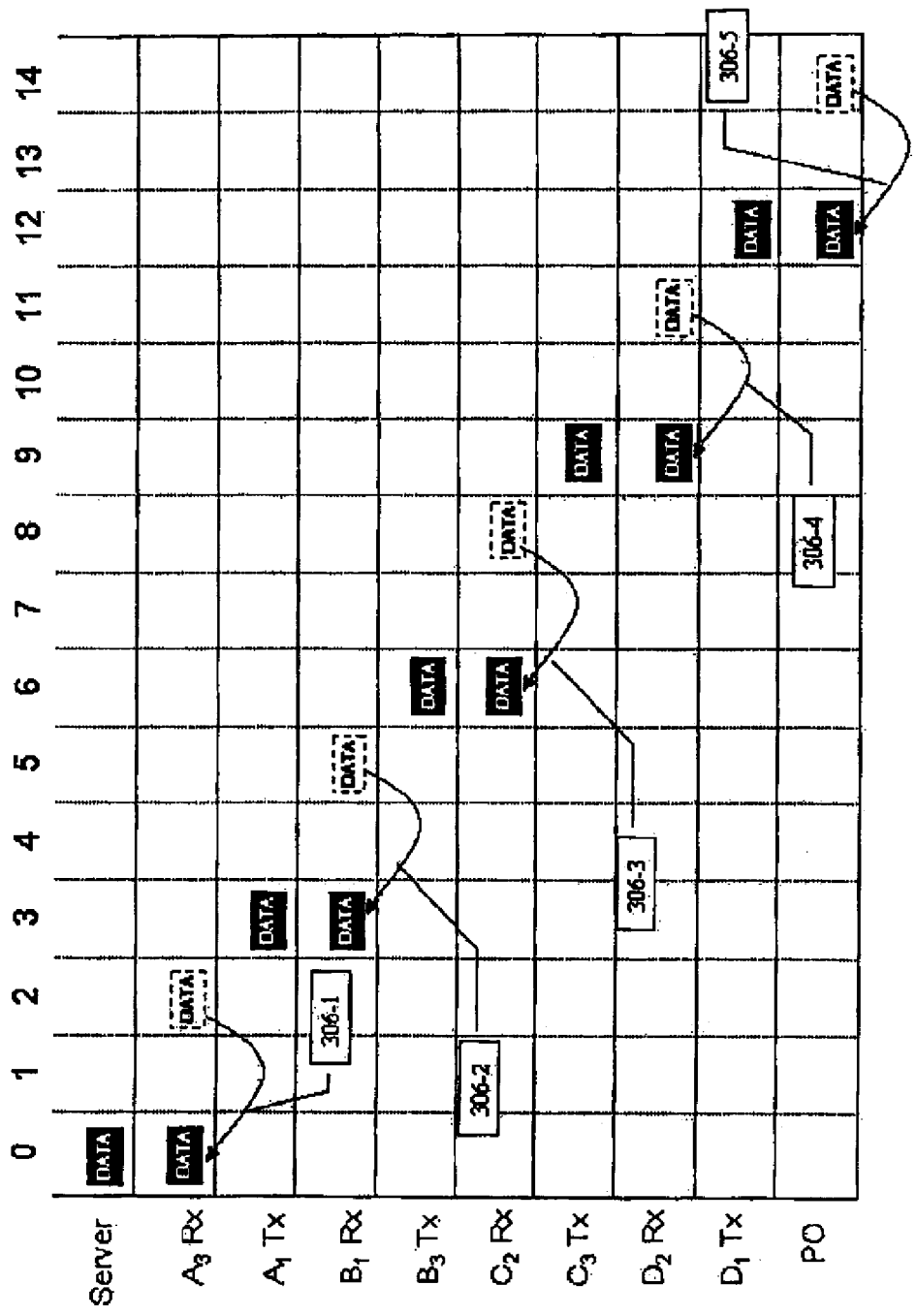
FIG. 14 shows an example of the movement of a data packet through a network to illustrate the effect of the skew compensation according to an illustrative embodiment of the present invention.

To deal with this problem, the Scheduled Switches, aware of the equivalent appointment delay, will "skew" the receive appointment windows by the appropriate amount to accommodate the delay. Thus, without the skew compensation, the packet would miss its assigned appointment and be declared "unscheduled" by the Scheduled Switch. FIG. 14 shows the effect of the skew compensation at (306-1), (306-2), (306-3), and (306-4).

Although the invention is described herein generally in terms of scheduling the transmission of IP data packets, persons skilled in the art should recognize that methods and apparatus can be envisioned that will transmit data packets that do not necessarily comply with IP standards without departing from the scope of the present invention.

Although the tumbler scheduling algorithm according to the present invention is described herein in terms of circular data structures, persons skilled in the art should recognize that the circular nature of the data structures represents the periodicity of scheduled appointments and that any number of alternative data structures which are not necessarily circular can be envisioned to implement the tumbler scheduling algorithm having required periodicity without departing from the scope of the present invention. For example, alternative embodiments of the invention can be implemented using sliding rectangular aligned arrays to implement a tumbler scheduling algorithm.

Although the present invention is described in terms of scheduling a transmission path between two endpoints, persons skilled in the art should recognize that alternative embodiments of the present invention can be envisioned which schedule a path between a plurality of transmitting endpoints and or a plurality of receiving endpoints without departing from the scope of the present invention.

Description For Achieving High Availability of Itineraries

During operation of a scheduled connection, described in the foregoing, as each packet in a data flow arrives at a (schedule-aware) router, the router is arranged to transmit the packet on the outbound port at the appointment time. Because scheduled packets are never placed in a stochastic queue (where they would contend for service with other packets), they do not experience any queuing delay, nor do they risk being dropped because a queue is full. Furthermore, there is no packet-level jitter. Clearly, scheduled networks are well suited for guaranteeing performance for isochronous data flows. Appointment scheduling is also efficient in that unreserved appointments are available to send unscheduled packets, and unused reserved appointments may be backfilled with unscheduled packets.

Although their real-time performance benefits are clear, scheduled networks must achieve utilizations of scheduled traffic that are equivalent to or better than those of current IP network models if they are to gain market viability and acceptance. For example, digital time-division multiplexed (TDM) telephony networks can reliably satisfy call requests when over 90% of the network capacity is already utilized. In contrast, current best-effort networks carrying a mix of, say, Voice-over-IP (VoIP) and computer-to-computer data traffic must operate at low utilization levels to achieve acceptable VoIP performance. The industry consensus is that the converged networks of the future will be IP networks, but the low-utilization obstacle must be removed.

For scheduled networks, utilization may be measured as the ratio of reserved appointments within schedules to the total number of appointments defined. Thus, the ability for a scheduled network to achieve high utilization is equivalent to its ability to find and configure itineraries for a network under heavy load—this ability is measured as the availability of itineraries. From the perspective of minimizing end-to-end delay, an ideal itinerary consists of (appointment, router port) ordered pairs with the property that adjacent appointments are separated in time only by the link transport delay. This selection means that as soon as a packet begins accumulating at a router, it can be cut-through to its next appointment on the corresponding outbound port. If the itinerary creation process were limited to producing ideal itineraries, then the difficulty of finding itineraries when utilization is more than a few percent would be significant. One should note that the tumbler-scheduling algorithm previously described also included "phase shifting" as a method for selecting an available appointment, i.e., by permitting a tumbler to be rotated to select a free appointment when a blocked appointment was encountered. As a theoretical matter, phase shift of anything less than one complete tumbler cycle could be implemented for each ring of the tumbler. However, it may be preferable to manage phase-shift parameters according to additional criteria described below.

In a scheduled network, isochronous data flows, such as VoIP sessions, are carried over a fixed path or set of fixed paths through nodes (routers) in the network. An itinerary creation process establishes scheduled flow paths before the flow begins, primarily by issuing a Node Traversal Request (NTR). Assuming a depth-first-search approach, an itinerary search process traverses a path by identifying an unreserved appointment at the first node in the path, identifying a compatible unreserved appointment at the next node, and so on, until it reaches the end of the path or until it blocks, i.e., until it cannot find a compatible unreserved appointment at some node in the path, as described earlier.

A Node Traversal Request (NTR) is comprised of a pair of endpoints that the system is attempting to connect across the scheduled network. Let the search process be modeled as a series of node traversal steps, or requests, where each node traversal request (NTR) is either satisfied by identifying a compatible appointment or is not satisfied, thereby blocking the search. One may then estimate the probability that the search process blocks at any given node and the probability that the search process blocks somewhere along the path. If "compatibility" between two adjacent appointments means that they are separated in time only by link transport delay, then the process will attempt to produce only ideal itineraries and is susceptible to blocking as utilization increases.

To increase the probability that an acceptable itinerary can be found under heavy network load, a system configured according to the present invention will expand the criteria for evaluating paths in a scheduled network. One or more additional steps are implemented during the search for acceptable itineraries, and additional means are incorporated for determination of when such a search has failed, and for selection of alternatives for rescheduling.

In accordance with principles of the invention, a system and method is disclosed herein that is capable of achieving high availability of itineraries for scheduled traffic in a scheduled network without adversely affecting a scheduled network's ability to meet performance requirements. Furthermore, the implementation of the invention can use either an "on-line" or an "off-line" approach, or both. This disclosure envisions an implementation based on either a fully distributed model, or an agent-based, special-purpose system model, or a hybrid of the two. The choice of approach is a system design issue that may depend on various requirements.

Overview of Additional Itinerary Search Techniques

Limiting the itinerary creation process to producing ideal itineraries makes it more difficult than necessary to find itineraries when utilization is more than a few percent. If instead the itinerary creation process is allowed to select elements of a non-ideal itinerary in which adjacent appointments are permitted to be separated in time by a phase-shift (where a unit phase shift is one appointment), then the probability of finding itineraries is greatly increased.

Each permitted phase shift adds to the end-to-end latency of the projected itinerary. With a schedule period of 20 ms, a large amount of phase shift could potentially accumulate across a long path; therefore, a reasonable limit should be placed on the amount of phase shifting, either at each node or across the path. Various criteria can be used for determining this limit, according to the end-devices and applications being connected (i.e., the amount of delay that they will tolerate and remain operational, or the amount of delay described in a Quality of Service parameter).

While limiting the total amount of phase shifting will decrease the probability of finding an itinerary for a single itinerary search attempt, the reduction can be countered by multiple itinerary search attempts. These multiple searches can be implemented as an Itinerary Search Graph (ISG) construction process with halting criteria derived from the network topology, current link utilizations, and desired availability of itineraries, or other factors that may be important in a particular implementation. The size of an ISG, as measured by the total number of edges, maps directly to itinerary availability and to computation time.

A third method, called Node Traversal Request (NTR) queuing, which is embedded in the ISG construction process, can be used in some cases to increase the chances of finding an itinerary while reducing the size of the ISG.

Analysis reveals that a judicious mix of phase-shift limits, ISG construction halting criteria, and NTR queuing (if supportable) enables a scheduled network to create itineraries even when the network is under heavy utilization, e.g., >90%, without any degradation in the performance of real-time applications. A system configured according to the present invention provides for high availability of itineraries in a Scheduled Packet Routing network. For example, analysis shows that the methods disclosed herein will enable 99.999% availability of itineraries in a highly utilized scheduled network (>90% utilization) while using a small amount of compute resources.

Additionally, the present invention also applies to other packet-routing or similar systems that may use a different dimension or dimensions other than time (e.g., frequency, time-frequency, flow type, packet type, packet mass (size), etc.) as a performance metric. Examples of how these methods apply to scheduled networks that schedule against dimensions other than time will help clarify the broad applicability of the invention. In an RTNSPRS, a phase shift maps directly to a time interval. Suppose a scheduled network uses frequency as the scheduled dimension. Then, the analogy to the phase shift is a frequency shift, i.e., by shifting the frequency or frequencies that compose a flow, one will decrease blocking probability. Suppose a scheduled network uses flow mass as the scheduled dimension. Then, the analogy to the phase shift is a mass shift, achieved by inserting or removing additional packets into the flow, or padding individual packets.

The present invention is illustratively embodied in the context of a schedule agent (SA) for administration of a scheduled network comprised of scheduled packet routers, as described above. The SA is configured according to the invention to implement a combination of steps calculated to result in high availability of itineraries (connections) during periods of high network utilization. Absent this or similar implementation, the SA is more likely to encounter blocked paths during periods of heavy network load, reducing the number of connections, even though there may be bandwidth available.

Description of Itinerary Selection Permitting Phase-Shifting

The blocking probability can be quantified by modeling the process that services an NTR at any node as an M/M/m/m queue, as described in T. Robertazzi, *Computer Networks and Systems: Queuing Theory and Performance Evaluation*, $3^{rd}$ Edition, Springer-Verlag, New York, 2000. At each node, the jobs that the queuing system services are NTRs. The itinerary search process generates arrivals (NTRs) to the system. Assuming that NTRs are Poisson-distributed, then the arrival process is Markovian. The duration of scheduled flow sessions is also Poisson-distributed, and therefore the service process is also Markovian. The queuing system servers are equivalent to appointments in the associated port's schedule, and the number of servers in the system, m, is equivalent to the number of appointments in the shift window. Finally, without an NTR queue, the total number of NTRs in the system at any time is at most m. In this context, we refer to the M/M/m/m queue as the NTR server system.

As will be apparent to those skilled in the art, the blocking probability of an NTR server system can be computed using the well-known Erlang B formula. The blocking probability of a series of NTR server systems (which represents the blocking probability of a multi-hop path) is easily derived as described at Equation 3 in the reference S. Moore, S. Chen, Availability of Scheduled Itineraries on IP Internetworks with Applications to VoIP, unpublished paper of Cetacean Networks, 100 Arboretum Drive, Portsmouth, N.H. 03801 [Moore and Chen], which is hereby incorporated by reference herein in its entirety. The referenced analysis shows that increases in the phase shift window size result in decreases in utilization of scheduled traffic, and decreases in the length of the path reduce the blocking probability. Reduced blocking probability directly increases the ability of a scheduled network to achieve high availability of itineraries. However, actively decreasing utilization of scheduled traffic to decrease blocking probability is obviously undesirable, even illogical. Decreasing the length of the path may be impractical or even impossible. Hence, increasing the phase shift window size is clearly the more practical method of decreasing blocking probability. Because some of the itineraries will contain more phase shift, they will have some amount of increased delay, making them secondary choices. However, in many applications, a phase-shifted connection with a slightly longer delay may be preferable to having a connection request be rejected for failure to find an ideal itinerary. As network utilization increases, blocking probability can be reduced by increasing the limit for acceptable phase-shifting. Applications that cannot tolerate transmission delays in excess of what is available may either be rejected, or may trigger additional searching adjustments.

Figure 18:
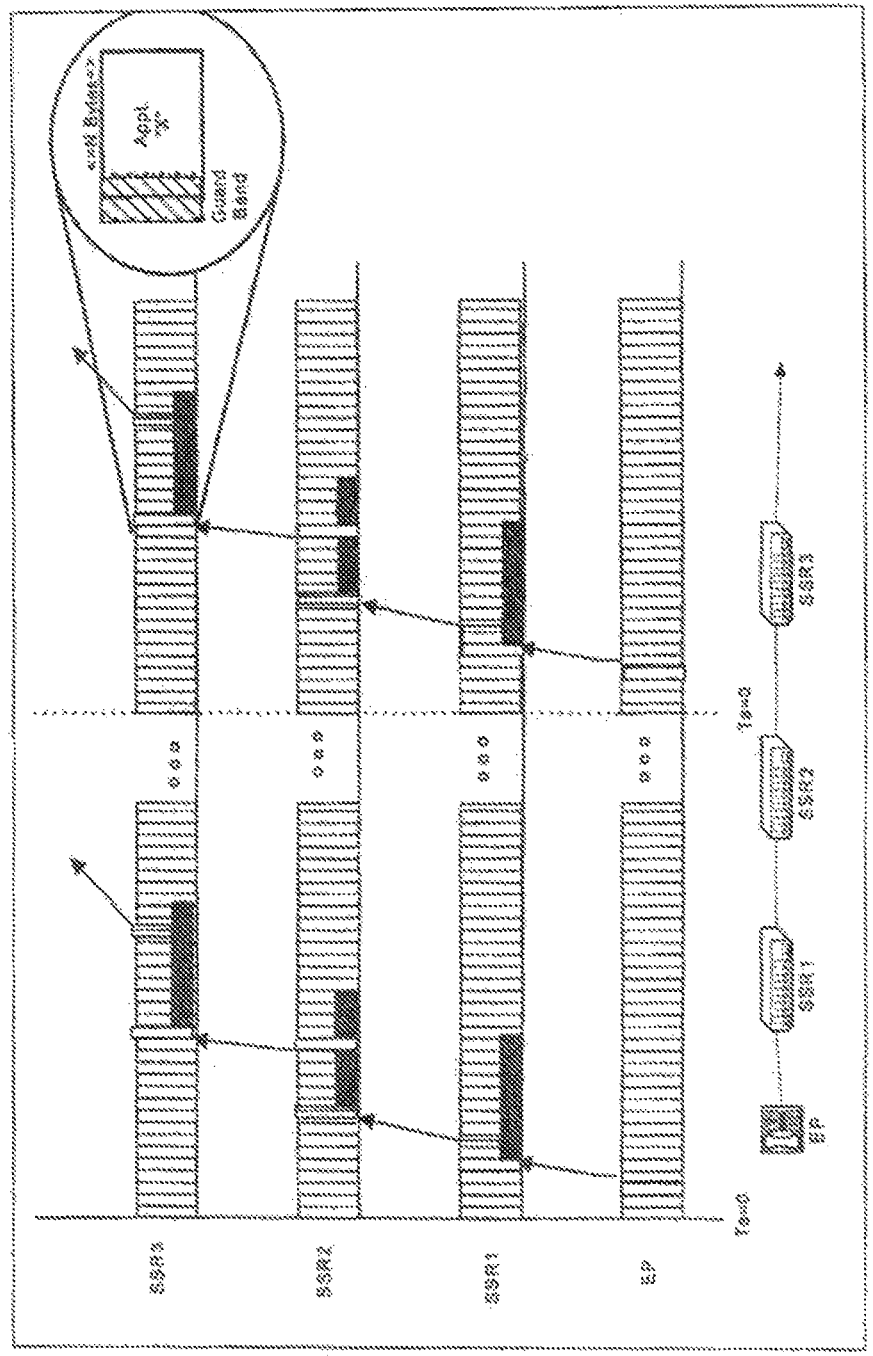
FIG. 18 shows the mechanics of an itinerary selected according to a phase-shifting implementation of an illustrative embodiment.

FIG. 18 illustrates the mechanics of phase shifting in an illustrative itinerary end system. Each scheduled device port has a repeating schedule. In this example, the schedule-repeat period is fixed at the same time span for all ports in the network. Schedules in turn consist of a set of appointments that are all equal in "bit-length". That is, a port transmits/receives the same number of bits during an appointment on any link. Therefore the time occupied by an appointment, and the number of appointments in a schedule, is proportional to the link speed. A 1-Gig link has 10× the number of (constant-size) appointments as a 100-Meg port.

The mechanics of scheduled networking are shown in FIG. 18 which shows a single packet flow from an endpoint (EP) passing through 3 scheduled switch/routers (SSRs). Two schedule cycles are shown. Note that the appointment assignments are identical from cycle to cycle.

First, the packet is emitted by the EP at the beginning of the appointment assigned by the SA. The receive port on SSR1 expects the packet to arrive at the beginning of its corresponding appointment. Consulting its schedule, SSR1 knows to forward the packet during the corresponding appointment on the output port to SSR2. Using flow knowledge, SSR1 has also held off any non-scheduled traffic on that port that would interfere with the scheduled packet. As soon as the scheduled packet transmission is complete, the port is available for non-scheduled traffic.

SSR2 expects the packet at the beginning of the corresponding receive appointment. However, in this case the packet is not switched out immediately. Instead, the output-port schedule specifies a phase shift of some number (e.g., 10) of appointments. This means that this packet's transmission is delayed an integral number of appointments by SSR2 in order to line up with SSR3's receive appointment. Phase shifts are part of the packet's itinerary—so it is repeated for each schedule cycle.

Phase shifting is not caused by network traffic at a particular point in time—it is a planned part of the schedule. Basically, a packet is received on a set appointment, buffered for a short time, and transmitted on a set appointment. Phase shifting reduces blocking probability when the SA calculates an itinerary. Packet flow still adheres to the strict itinerary and non-scheduled traffic is intelligently held off.

Some further appointment details are shown in the inset of FIG. 18. Each appointment is "N" bytes and all appointments within the network are the same length. Since it is impossible to completely remove jitter, each appointment starts with a "guard band". The SSR looks for the beginning of a scheduled packet during this time. If no packet starts during this time, the SSR concludes no scheduled packet is being switched during that appointment time—freeing it to switch unscheduled traffic as it sees fit. The guard band is a small, fixed number of bits long. The exact number of bits varies depending on connection type, link speed, etc.

Figure 15:
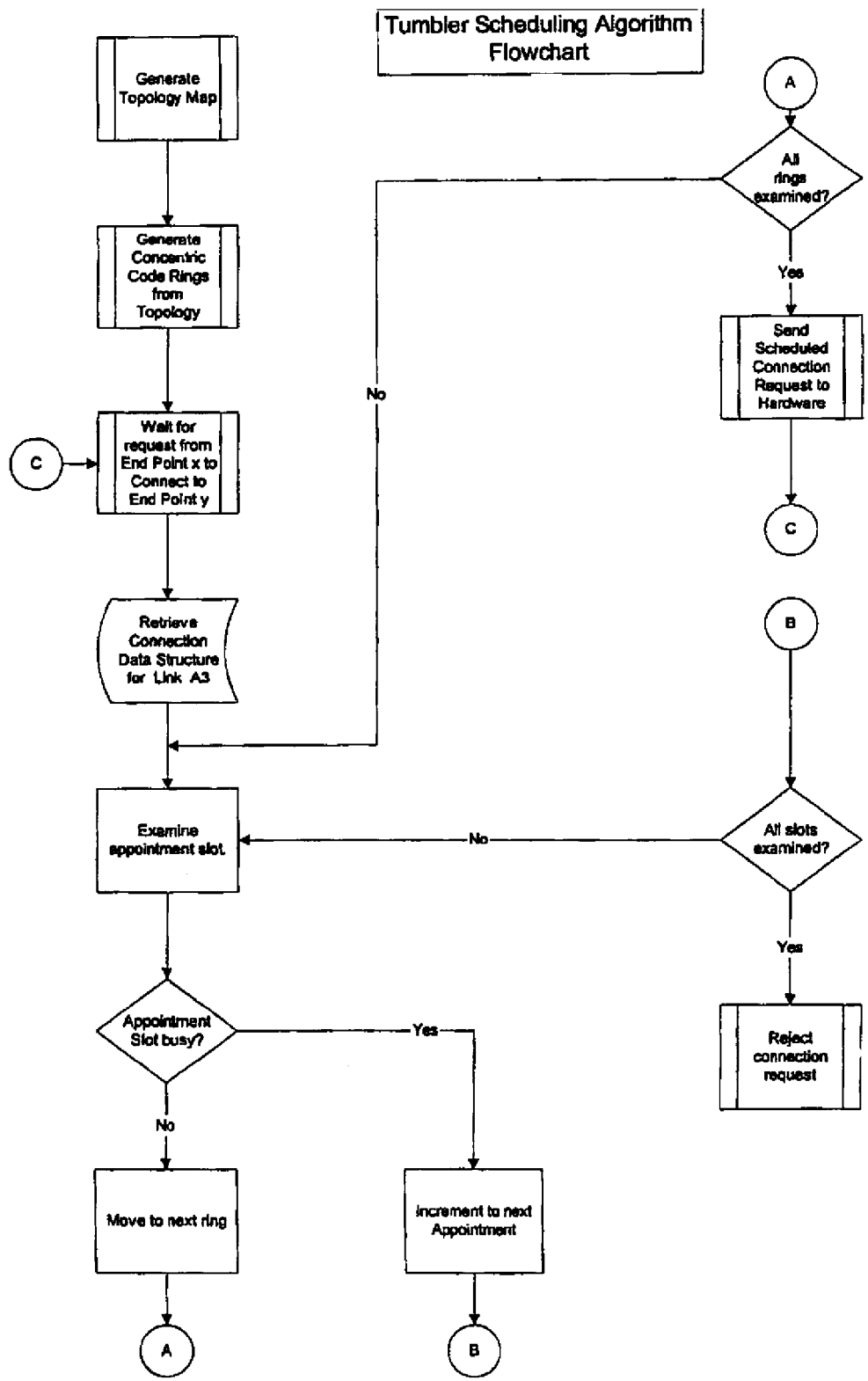
FIG. 15 shows a flowchart for a Tumbler Scheduler Algorithm according to an illustrative embodiment of the invention.
Figure 16:
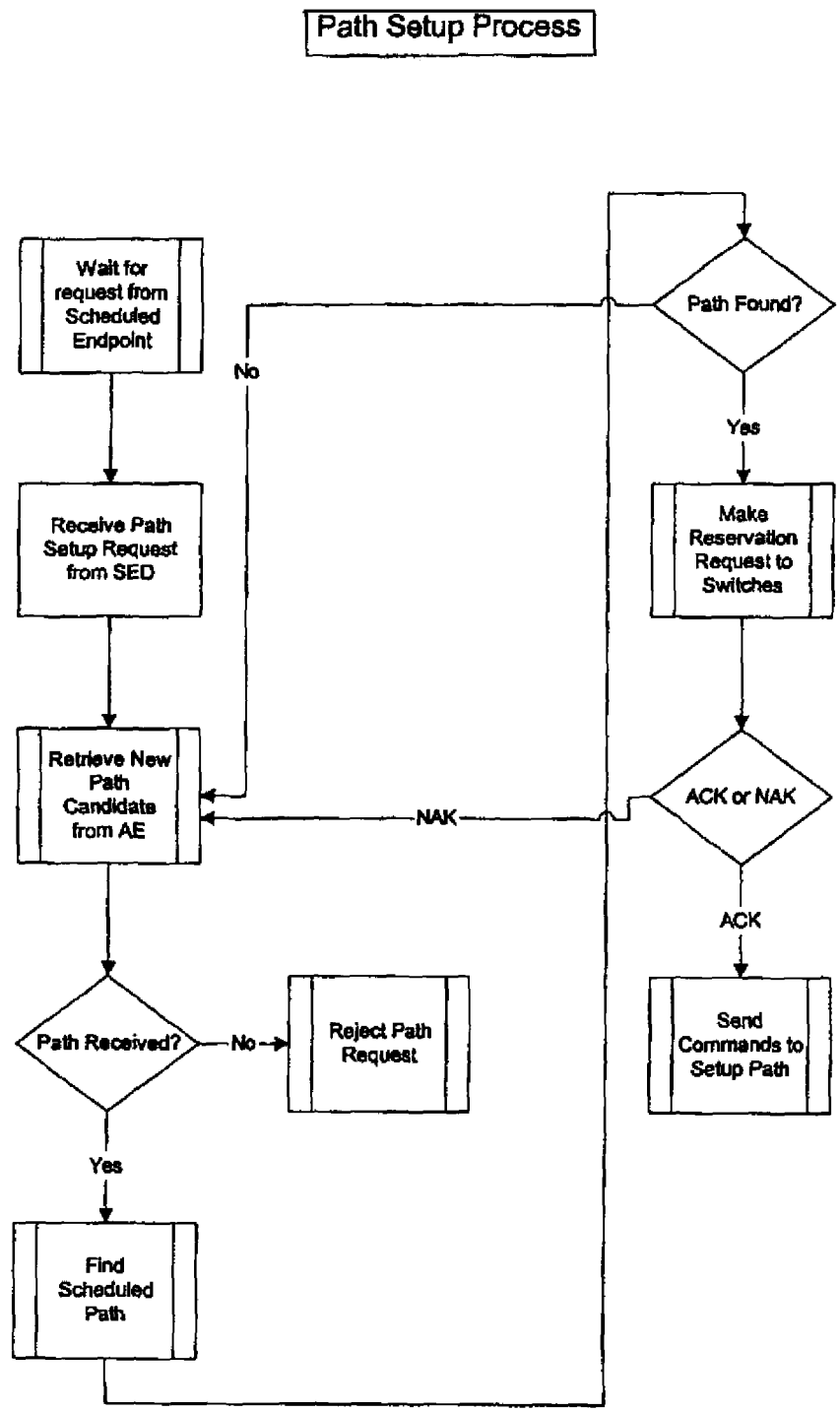
FIG. 16 shows a flowchart for a path setup process according to an illustrative embodiment of the present invention.
Figure 19:
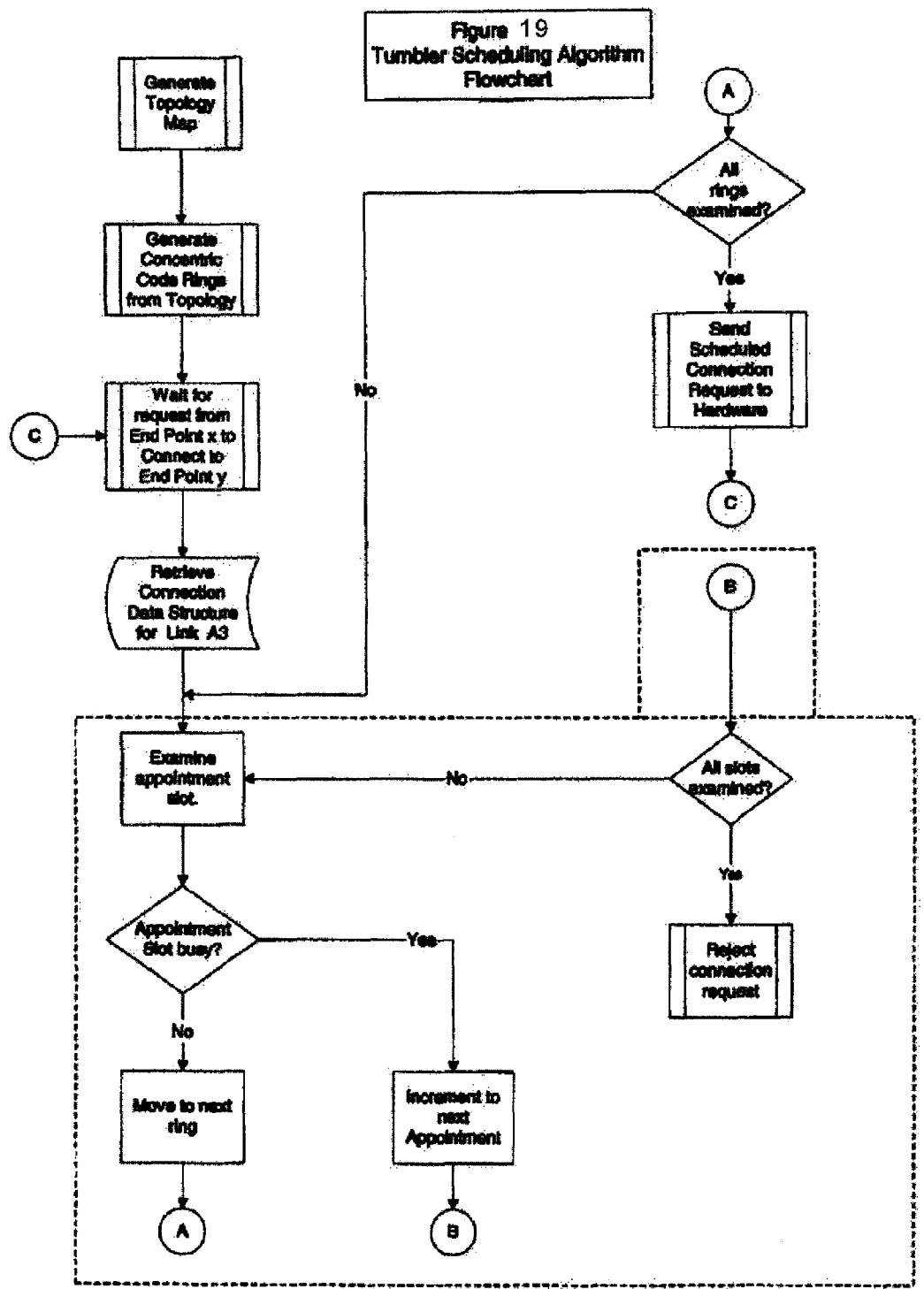
FIG. 19 shows the portion of the flowchart in FIG. 15 which can be modified according to various alternative embodiments described herein.

FIG. 19 is a marked-up copy of FIG. 15, the "Tumbler Scheduling Algorithm", having a box with dashed lines drawn around the part of the block diagram that is modified for this description with respect to phase shifting. FIG. 19 indicates the use of phase shifting, e.g., the process labeled "Increment to next Appointment", but there are no bounds placed on the amount of phase shifting allowed. In practice, implementations will need to limit the amount of phase shift in order to control usage of memory and buffer resources, as well as controlling cumulative delay.

Figure 20:
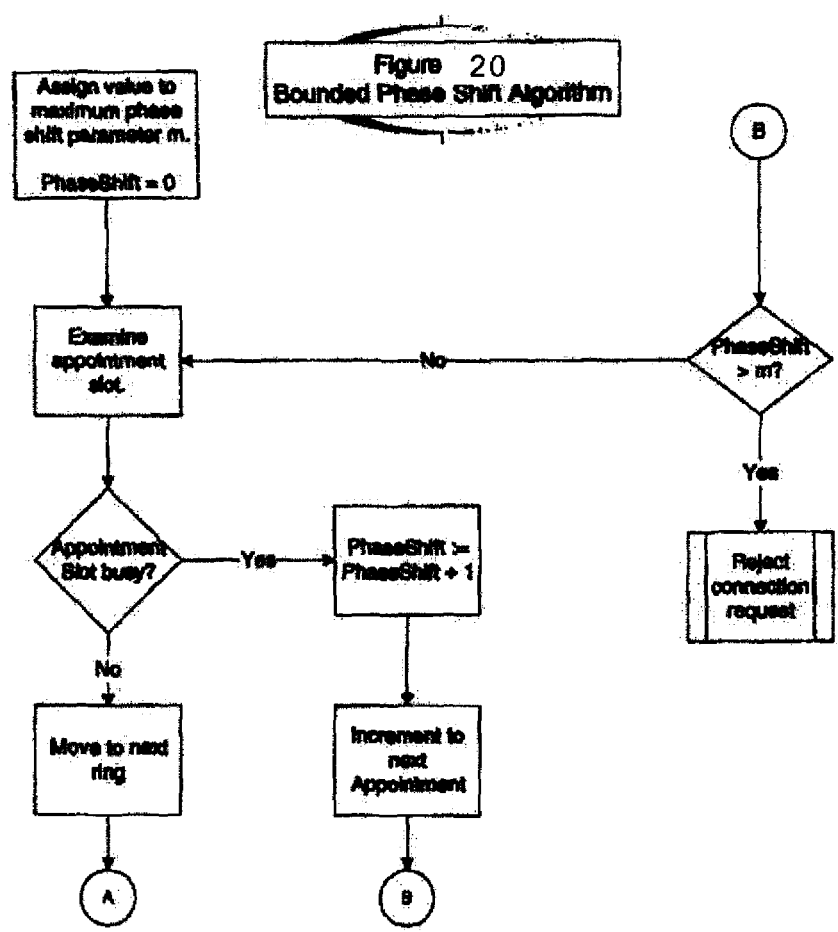
FIG. 20 shows a flowchart illustrating changes to FIG. 15 in an alternative embodiment implementing phase-shifting.

FIG. 20 replaces the diagram within the dashed-line box of FIG. 19 in order to describe an implementation of bounded phase shift. The maximum phase shift value m should be assigned using the methods described herein, and will be based on environmental parameters such as network size, maximum allowable connection setup time, connection request blocking probability requirements, and available resources. A PhaseShift counter variable, initialized to zero, is incremented each time the next Appointment Slot is found to be busy, until an open appointment slot is found or until PhaseShift exceeds the maximum phase shift value m.

Figure 21:
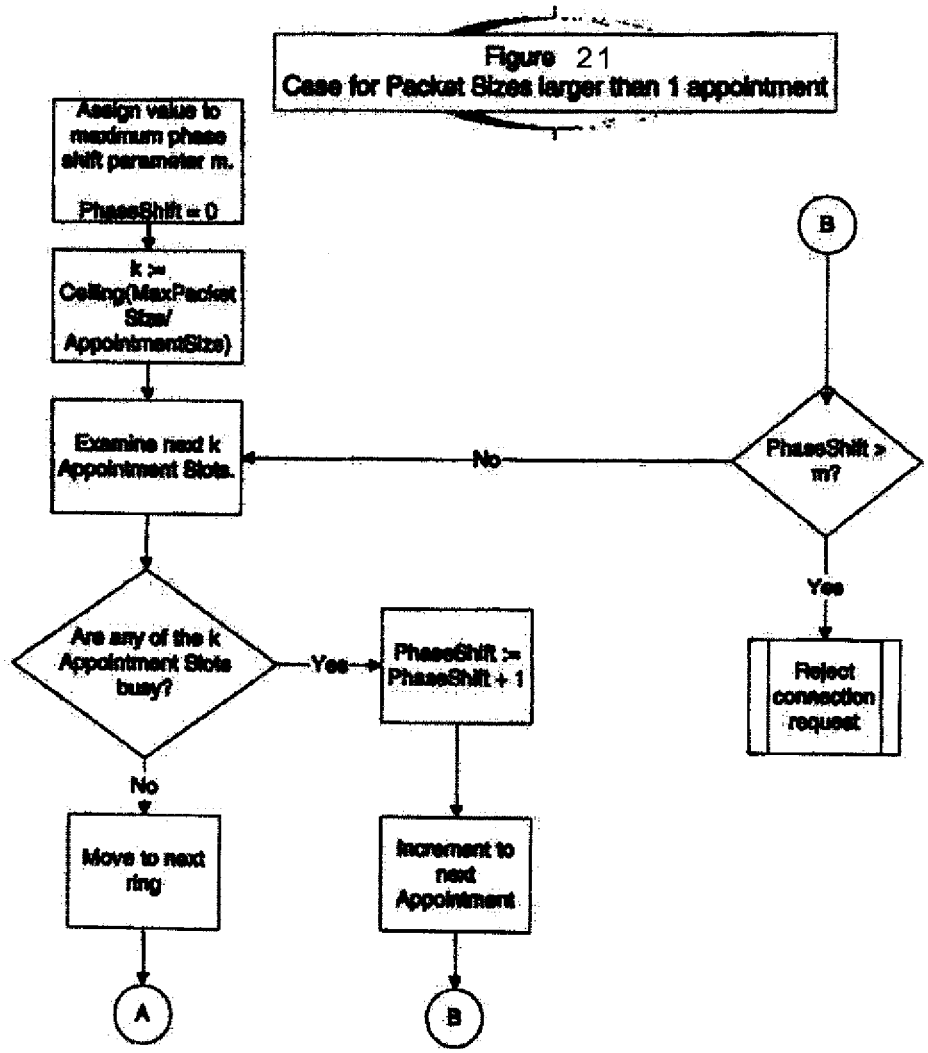
FIG. 21 shows a flowchart illustrating changes to FIG. 15 in an alternative embodiment implementing phase-shifting for a system having packets larger than one appointment time.

FIG. 21 extends the algorithms of FIGS. 19 and 20 to the case where the packets in the scheduled flow are larger than 1 appointment. The blocking probability analysis, as well as the methods for choosing the maximum phase shift value m, for this case is detailed in S. Moore, Availability of Itineraries for Heterogeneous Traffic in Scheduled Networks (herein Moore's Availability), unpublished paper available from Cetacean Networks, Inc., at the address mentioned herein. In FIG. 21, the number of appointments k needed by a packet is included in the logic and initialized by rounding up to the next integer the ratio of the maximum packet size of the flow to the size of the appointment slot. As an example, suppose appointment slots are configured to be of size 250 bytes, and the system wants to schedule a flow consisting of packets with sizes up to 1538 bytes. Then the value of k needs to be at least 7 appointments, since Ceiling (1538/250)=7.

Note that in a typical circuit-switched telephone system, the call setup mechanism across a series of switches can also be modeled as a call setup process across a series of M/M/m/m queues. Hence, the NTR server system is a packet-routed network analog of a circuit-switched telephony switch. The phase-shift method for decreasing blocking probabilities in a scheduled network is analogous to the use of a link from an (arbitrary) input port to an (arbitrary) output port in a circuit-switched telephony switch. The success of the method in a telephony context attests to the viability of an analogous method in a scheduled packet network context. However, in a packet-switched scheduled network, there are two side effects of phase shifting that may have deleterious effects on a practical scheduled network's ability to achieve high availability of itineraries.

One side effect is that a phase shift corresponds directly to time, and hence any non-zero phase shift introduces a deterministic delay. Recall that the unit of phase shift is an appointment, which may, for example, only be 20 microseconds for a 20 ms schedule on a 100 Mbps link with an appointment size of 250 bytes. If phase shifts at each node are small, e.g., a few appointments, then the accumulated deterministic delay across a multi-hop path will be inconsequential. If instead the phase shifts are large at each node, then the accumulated delay may be large enough to be unacceptable to an associated real-time application. The other side effect, memory usage, is directly related to phase-shift delay. Delay implies that phase-shifted packets are buffered during the shift. Large delays for lots of flows will drive up the buffer memory requirements. On current packet-switched routers that use network processors to implement advanced wire-speed functionality, data and instruction memory is at a premium, so without controls on phase shifting, available memory may be exceeded. In other words, the upper limits of phase-shifting would be determined by the amount of buffering memory at the selected switches, and the amount of end-to-end delay permissible in the application.

Both of these side effects argue for reducing the maximum phase shift at each router, but of course this increases the blocking probability. Another method can be used to decrease the blocking probability even when the phase-shift maximum is reduced for operational reasons. This method is called NTR queuing.

Description of NTR Queuing Method for Itinerary Search

To explain NTR Queuing, note that in the M/M/m/m NTR server system, an NTR that arrives when all m servers are busy is immediately blocked. One option is to queue the NTR, under the assumption that as soon as a server becomes available, it is allocated to the first NTR in the queue. A queued NTR server system can be modeled as an M/M/m/j queue, where j>m and j−m is the queue size.

Figure 22:
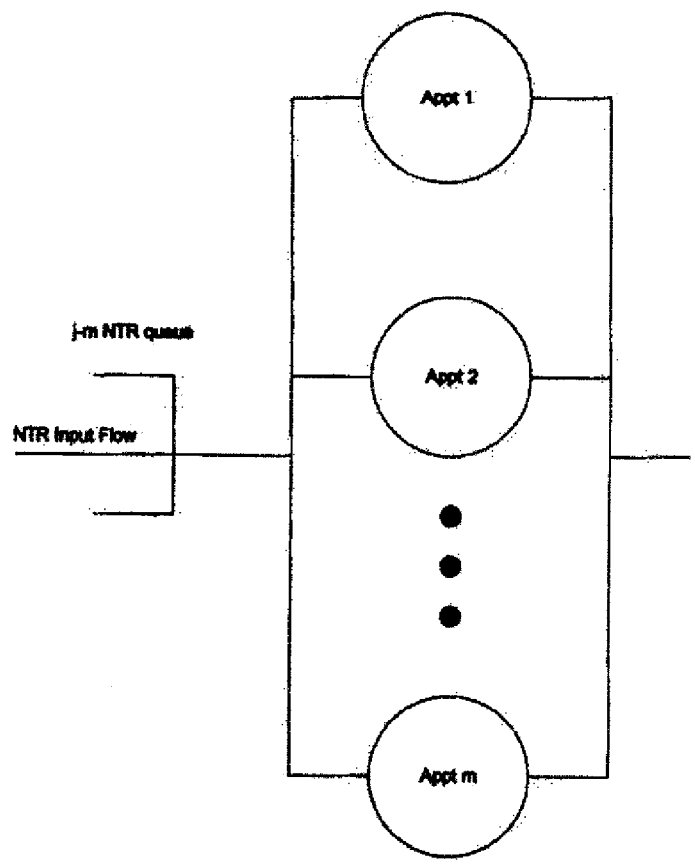
FIG. 22 illustrates a flow diagram for an NTR queuing system according to an alternative embodiment of an itinerary selection algorithm.

FIG. 22 illustrates an NTR server system. NTRs entering a node see an NTR server system consisting of m servers, where a server represents an appointment. If any appointment is unreserved, i.e., if any server is available, then the NTR reserves the appointment. If there is no NTR queue, i.e., j=m in FIG. 22, then the NTR server system is modeled as an M/M/m/m queue. If there is NTR queuing, then the system is modeled as an M/M/m/j queue, with j>m.

In Moore and Chen it is shown that the blocking probability decreases exponentially in the ratio of j/m (i.e., very fast). Hence, reduced blocking probability incurred by a reduction in phase-shift window size is readily countered with the NTR queuing method. However, as with phase shifting, the NTR queue limit should not be set to arbitrarily high values, because an ISR might wait in the queue for a long time. The associated application might have flow setup requirements that will not allow for long setup times. The specifications for call setup may specify a number of seconds or other standardized time within which a connection request must be honored or rejected. For example, VoIP applications typically require a call setup time of two (2) seconds across a path of any length. If one were to assume two seconds are available, and there are ten hops in each of ten possible paths for crossing the network, then a reasonable NTR queuing limit would be $2/10$ of a second for each hop. In other words, the SA could only queue an NTR request for $2/10$ of a second before rejecting that path (as blocked) and starting on another one.

The blocking probability for a single itinerary search attempt can be significant. As noted above, one can decrease the blocking probabilities with NTR queuing if session setup time requirements are relaxed, but many real-time applications have strict requirements (e.g., VoIP targets setup times of two (2) seconds or less).

Figure 23:
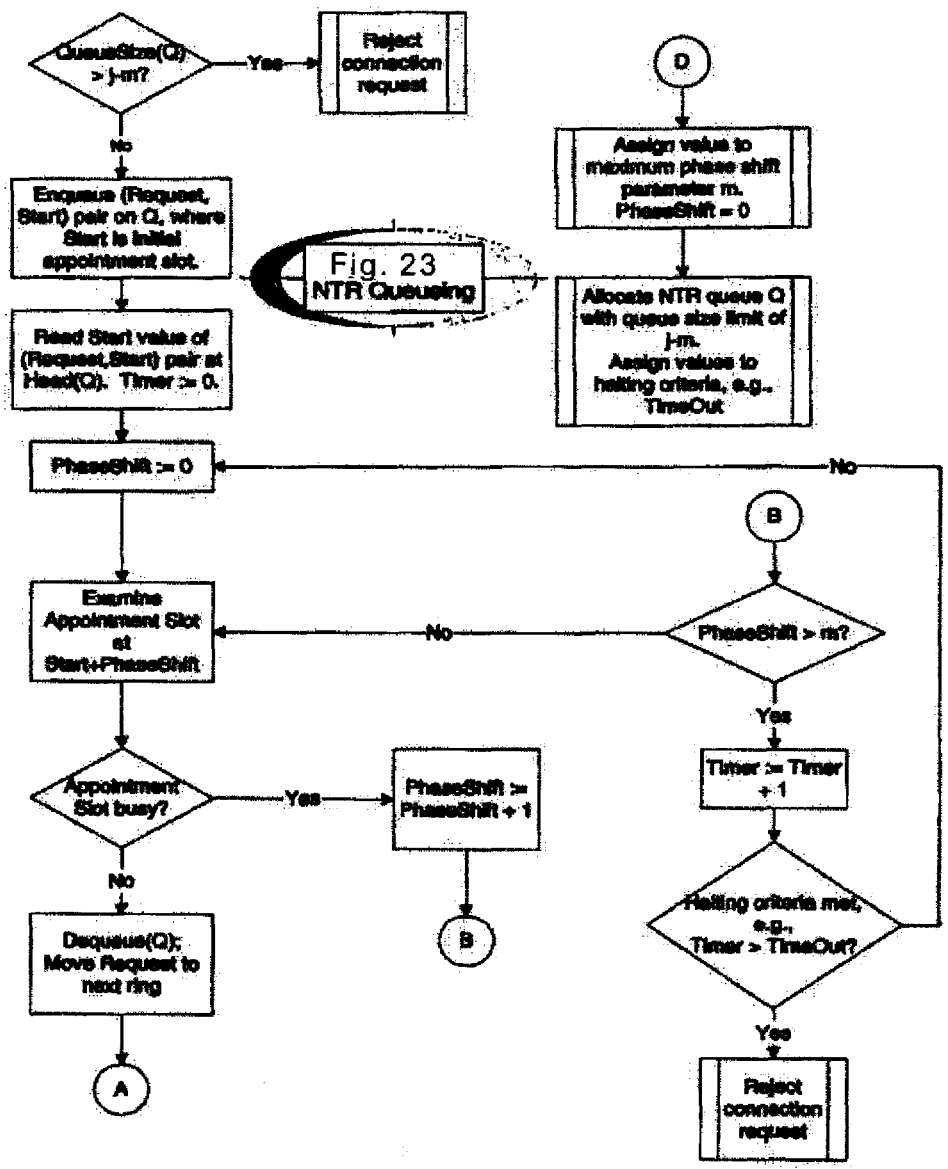
FIG. 23 is a flowchart illustrating changes to FIG. 15 for an NTR queuing system according to an alternative embodiment of an itinerary selection algorithm.

FIG. 23 replaces the diagram within the dashed-line box of FIG. 19 in order to describe an implementation of bounded phase shift with NTR queuing. An NTR queue Q is initialized to queue size j−m, where j and m are chosen based on environmental requirements and by using the methods detailed in Moore and Chen and in Moore's Availability. A TimeOut value or other halting criteria may also be initialized before starting the search. As NTRs, or connection requests, arrive at each link in the path, they are enqueued on Q along with the Start location of an appointment slot, i.e., the appointment with PhaseShift=0. The system tries to find an open appointment slot for the NTR at the head of Q by continually checking the availability of appointments within the phase shift window (i.e., appointments Start through Start+m). The NTR at the head of Q is de-queued when either an open appointment slot has been found or the halting criteria are met. As in FIG. 21, the system is easily extended to include the case for connections with packets larger than 1 appointment.

Description of an Implementation Using Itinerary Search Graphs

Another approach to increasing itinerary availability is to search multiple potential paths until an itinerary is found or until a halting criterion has been reached. Intuitively, the probability of finding an itinerary increases as more potential paths are searched (i.e., as the ISG's size increases), but at the expense of increased search time. What is the relationship between graph size and itinerary availability? The answer defines a halting criterion for the ISG construction process.

We model the process of searching multiple potential paths as a graph construction process because of the historical use of graphs as a standard data structure for design and analysis of search algorithms in large, complex state spaces. By defining an abstract graph construction process, we also do not presume an approach to search implementation, such as a depth-first search, because an implementation should be matched to the application and architectural environment. For example, in a highly distributed environment, a distributed ISG construction process should probably use some variant of a breadth-first-search approach or of a branch-and-bound search approach, instead of a depth-first-search approach.

The mapping from an itinerary search process to a graph data structure is as follows: The vertices of an ISG are search path nodes. Leaf nodes represent either a node that blocks or the final node in an itinerary. Non-leaf nodes are nodes that have been traversed during the itinerary search process; these nodes represent (appointment, router port) pairs along a potential path. Each path from a root node to a leaf represents a path that was explored as part of the ISG construction process. The ISG construction process halts when an itinerary has been found or a halting criterion has been met. Hence, the number of (directed) edges in an ISG corresponds directly to the amount of computation time used to construct it. Intuitively, the number of edges in an ISG reflects link utilizations, under the assumption that higher link utilizations will usually result in a graph with more edges. Hence, we are interested in estimating the expected number of edges in an ISG, or equivalently the number of search paths necessary to find an itinerary. The expected number, and possibly the variance, can be used to create hafting criteria for the ISG construction process.

Figure 24:
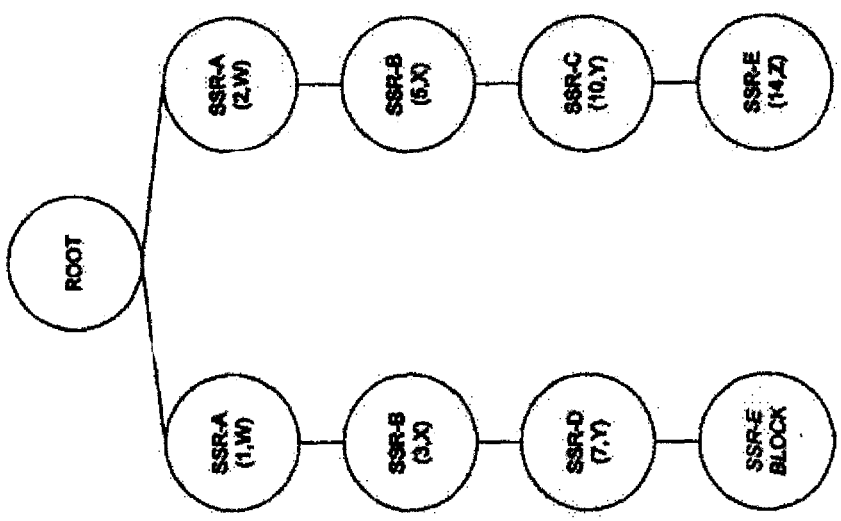
FIG. 24 illustrates an example of an Itinerary Search Graph constructed for an alternative embodiment of the itinerary selection system.

FIG. 24 illustrates an example ISG constructed as part of an itinerary search process. The ISG has two paths, one with a blocking leaf node and one with a non-blocking leaf node. The path from the root to the non-blocking leaf represents an itinerary that was found during the ISG construction process. Each non-leaf node in the graph (with the exception of the ROOT node) represents an (appointment, router port) pair. Hence, the path from the ROOT to the blocking leaf represents an itinerary search that first identified a path through SSR-A: (Appointment 1, Port W), then through SSR-B: (Appointment 3, Port X), then through SSR-D: (Appointment 7, Port Y), but blocked at SSR-E, the last node in the path. The path from ROOT to the non-blocking leaf (the found itinerary) found a path through SSR-A: (Appointment 2, Port W), then through SSR-B (Appointment 5, Port X), then through SSR-C: (Appointment 10, Port Y), then through SSR-E: (Appointment 14, Port Z). The ISG could have halted either because the halting criterion was two (2) leaves, or because it found an itinerary.

Figure 25:
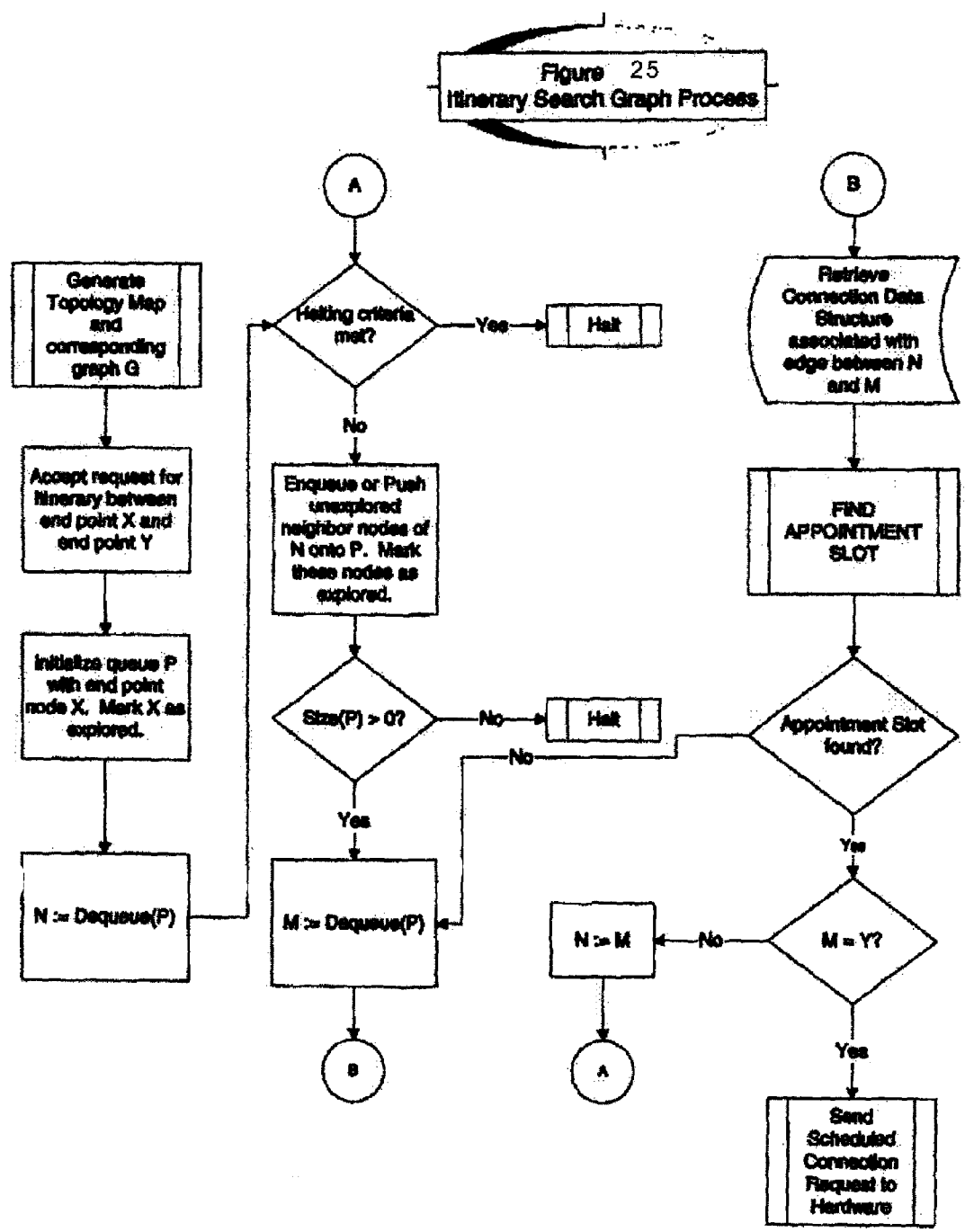
FIG. 25 shows a flowchart of a process for an illustrative embodiment of an itinerary search process using ISG.

FIG. 25 provides a block diagram of an ISG process. The process block labeled "FIND APPOINTMENT SLOT" includes any of the processes shown in FIGS. 20, 21, and 23. However, the process "Reject Connection Request" in those Figures should be replaced with a process that signals whether or not an appointment slot was found. After generating a topology map, the system creates a graph G corresponding to the topology map, with nodes and vertices corresponding to SSRs and interconnecting links, respectively, in the topology map. An itinerary search is initiated in an attempt to satisfy the connection request. A queue P containing unexplored graph nodes is the data structure used to guide the search. For example, when the node at the head of the queue is dequeued, its unexplored neighbor nodes can either be enqueued on P or pushed onto P. If the neighbor nodes are enqueued, then the itinerary search will be breadth-first, which may more suitable for a distributed implementation. If the child nodes are pushed onto P, then the itinerary search method will be depth-first, which may be more suitable for centralized implementation. Such general graph search methods are well known and detailed in T. Cormen, C. Leiserson, R. Rivest, *Introduction To Algorithms* (herein "Cormen"), MIT Press, McGraw Hill, 1990 (Cormen). The itinerary search continues until the connection request is satisfied or some search halting criteria are met. Examples of halting criteria are described in Moore and Chen. A method to limit the size of the search graph is not to enqueue or push onto P all of the child nodes of the node at the head of the queue, but instead only enqueue or push a subset of the child nodes onto P. This is particularly relevant for distributed implementations and is noted in detail in Moore and Chen.

The ISG construction process can be modeled as a series of Bernoulli trials, where a trial is the construction of a path from a root node to a leaf. The formula for expected number of leaves (as well as the variance) in the ISG is well-known to those skilled in the art; see, e.g., Cormen. From the Bernoulli distribution formulae, one can derive the expected number of leaves for a given itinerary availability requirement and for a given set of link utilizations. For example, as detailed in Moore and Chen, for a VoIP application with a requirement of 99.999% availability of itineraries across a 40-hop path in a network with all scheduled link utilizations operating at 90%, the expected number of leaves in the ISG is 635. This ISG can be computed on a standard workstation in approximately 1 millisecond.

The preceding analysis and results demonstrate the flexibility available to the design of a system for finding itineraries in a highly utilized scheduled network. By using some combination of values for phase-shift window size, NTR queue limit, and ISG halting criteria, availability of itineraries is high even when scheduled utilization is high.

In summary, there are three (3) primary methods to this invention: (1) phase shifting, (2) NTR queuing, and (3) ISG construction process with halting criteria derived from network topology, link utilizations, and availability requirements. Each method controls delay and resource usage while dramatically increases itinerary availability. Further combining the methods results in further increases. These methods enable scheduled networks to achieve very high (>90%) utilization of scheduled traffic while maintaining very high (99.999%) availability of itineraries, representing a large increase over the capabilities of today's best effort networks, which typically operate in the 20-30% range for non-real-time traffic and at 10% utilization or less for real-time traffic.

Description of Centralized and Distributed Considerations

Systems for implementing the above-described methods may include both centralized and distributed architectures. A discussion of the relative merits and issues associated with both architectures can be found in the Moore and Chen reference. Here we describe the architectures at a high level.

In the context of RTNSPRSs and high availability of itineraries, the primary difference between a centralized architecture and a distributed architecture is the existence or non-existence of centralized knowledge of the scheduled network topology and scheduled state. That is, if a representation of the network topology (e.g., a graph data structure) and the state of the schedules in each router in the network exists in centralized memory of some device, and scheduling decisions are made by that device based on its knowledge of the network, then the architecture is centralized. If instead the topology and state information are distributed across a distributed memory system, and if scheduling decisions are made by devices using only local information, then the architecture is distributed. Because this invention is concerned mainly with itinerary establishment and availability, we will describe high availability itinerary setup for both architectures.

Centralized Scheduling Architecture

Without loss of generality, for the centralized architecture case, assume that the network topology and scheduled state are instantiated in the local memory of a workstation-class computer, the Schedule Agent (SA), that is attached to the scheduled network. Assume further the existence of a signaling system and protocol for communicating network topology information, schedule state information, itinerary setup/teardown requests/responses, and other information between the SA and other elements attached to the scheduled network (e.g., routers, application servers, endpoints, etc.). One skilled in the art may observe that such a signaling system could be implemented as a generalization of the intra-domain protocols, where domains are analogous to switches that must be traversed in order to setup a call. In particular, it may be useful to view interconnected domains as a network of "virtual" scheduled switch/routers (SSR), with the corresponding SAs in the core. The next-hop domain is the next virtual SSR through which an itinerary must be scheduled.

The itinerary process begins when an element, typically an endpoint such as an IP telephone, signals a request to communicate with another element. The request may be handled initially by the SA or by an application server, which then signals the SA. In any case, the SA is requested to setup an itinerary for the communication session. Using the local copy of the network topology and knowledge of the scheduled state (all active itineraries currently scheduled in the network), the SA initiates an itinerary search process. The SA itinerary search process uses some combination of the methods described above, i.e., phase shifting, ISG construction, and NTR queuing, to find an itinerary. If an itinerary is found, then the SA communicates necessary information to the endpoints, routers, and other elements that will implement the itinerary. After all of the elements have acknowledged the receipt and handling of the itinerary information back to the SA, the SA then signals the application server that the itinerary has been setup. The application server signals the endpoint that it can begin sending its scheduled flow through the itinerary.

Distributed Scheduling Architecture

As noted earlier, in a distributed architecture, no network element has complete knowledge of the network topology or scheduled state. Instead, elements that participate in itinerary implementation know local topology, i.e., the other elements to which they are directly connected by a communications link, and the state of the schedules operating on their local communications ports. As in the centralized case, assume the existence of signaling systems and protocols for communicating itinerary setup requests and supporting information.

The network element that initiates an itinerary setup will create a request message that contains at least the following information items:

(a) Destination IP Address and Estimated Distance from source (in hops)
(b) Branching Factor
(c) Distance Traveled (in hops) since last branch.
(d) Outbound Appointment Set
(e) Phase shift window size (optional)

Figure 26:
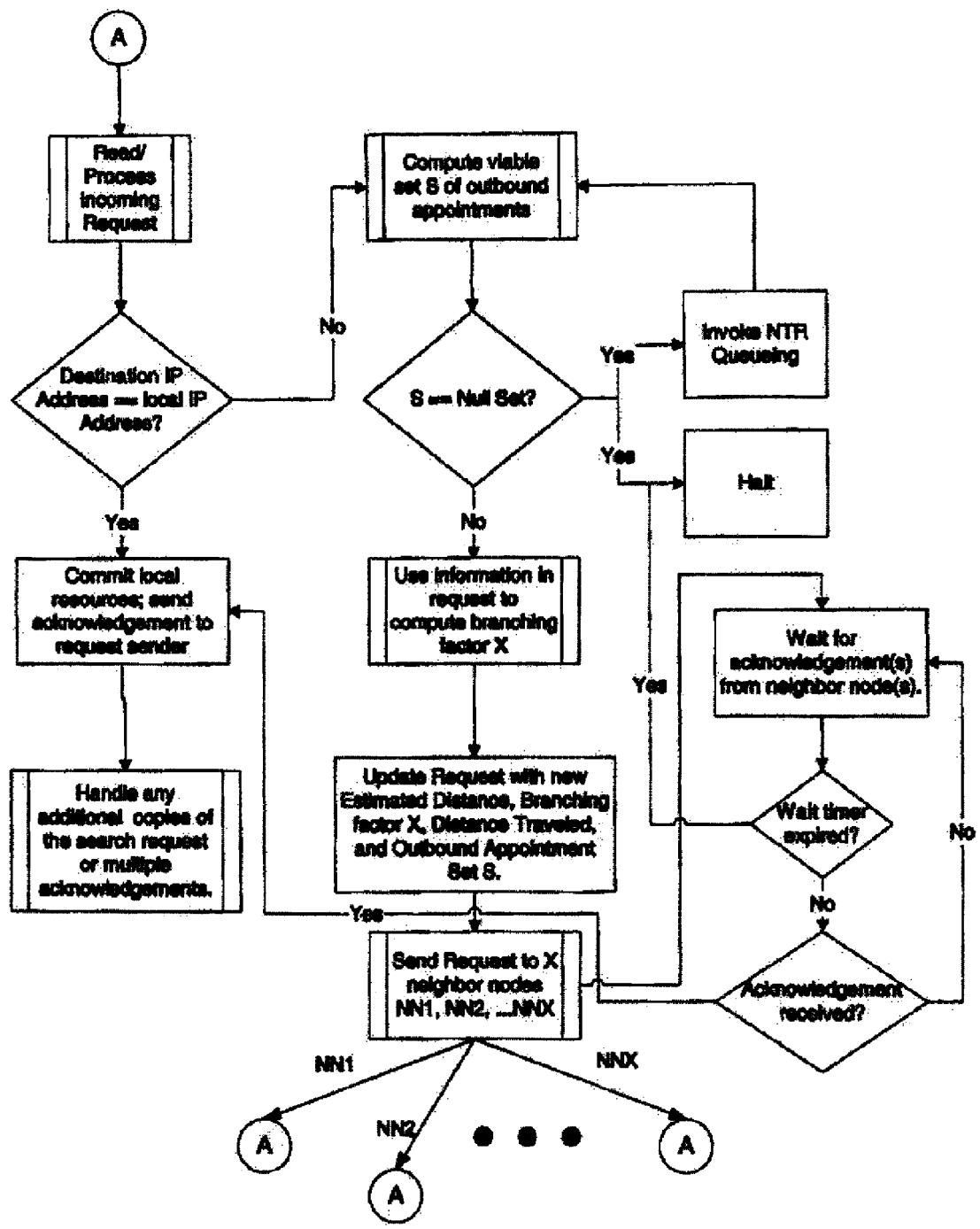
FIG. 26 is a flowchart for execution of a distributed itinerary search algorithm and shows the logic for each node in a collection of nodes over which the distributed itinerary search is conducted.

Using its local topology information, the initiating element will send this request message to one or more directly connected elements. FIG. 26 is a flowchart of the logic executed at each node participating in the distributed itinerary search. Each element that receives a request message handles it by executing the following actions:

1. Upon receipt of an itinerary search request, read the Destination IP Address in the Request and compare it to the local IP address. If the Destination IP Address of the Request and the local IP address are the same, then the search is completed. Commit any local resources (e.g., any application-level buffer resources). Decide which appointment(s) in the Outbound Appointment Set will be used locally, and include them in a Request acknowledgement sent to the upstream neighbor node. Note that other copies of the Request may arrive later; these could be handled, e.g., by not acknowledging them. Note also that multiple acknowledgements from downstream neighbor nodes may also arrive after a Request acknowledgement has been sent; these could be handled by ignoring them.

2. If the Destination IP Address of the Request and the local IP address are not the same, then examine the Outbound Appointment Set in the Request. Note that these appointments are now interpreted as incoming arrival times. Note further that the Set might be pruned in order to reduce the number of possibilities (i.e., prevent a combinatorial explosion) and therefore control the size of the Request message. From the Set of incoming arrival times, compute viable outbound appointments using any of the approaches described elsewhere in this document, and create a new Set S consisting of these outbound appointments. S will be included in the Request issued by this node. S may also be pruned to control the size of the request message.

3. If S is empty (the null set), i.e., there are no viable outbound appointments, the implementation can either halt, which kills the associated branch of the distributed search, or invoke NTR queuing (as described elsewhere in this document).

4. If S is not empty, then a decision needs to be made about the number of neighbor nodes to which the Request will be sent. This number is the branching factor X, and should be computed using information in the Request. Methods for computing X are described in Moore and Chen.

5. Update the Request with new Estimated Instance information (computed using, e.g., routing table information), branching factor X, distance traveled (which could be derived, e.g., from the TTL counter in the IP header), and the new outbound appointment set S.

6. Send the Request to X different neighboring nodes. If the number of neighbor nodes is less, then send the Request to just those nodes. If the number of neighbor nodes is exactly X, then send a Request to each neighbor node. If the number of neighbor nodes is greater than X, then select X neighbor nodes and send the Request to the selection. Selecting X neighbor nodes could be done randomly, or it could be done using routing information. For example, certainly one of the nodes in the set could be the next hop node listed in the local routing table generated by the routing protocol (e.g., OSPF). Most routing logic and associated routing tables are one-dimensional in that only a single next hop is stored in a routing or forwarding table for a given Destination IP address. Possibly during the routing/forwarding process, other alternative next-hop neighbors may be retained instead of pruned for use by the distributed itinerary search algorithm.

7. Reset a wait timer (possibly use the Estimated Distance and Distance Traveled information in the Request to choose the timeout value), and wait for acknowledgement(s) from downstream neighbor nodes. If the wait timer expires before receiving any acknowledgements, then halt. Otherwise, upon receipt of an acknowledgement, read the appointments in S selected by the downstream neighbor node and commit local resources accordingly. Then, send an acknowledgement to the upstream neighbor node.

With respect to the methods identified in this patent, phase shifting is implemented as part of Actions (1) and (2), and the ISG construction process is implemented by Actions (3)-(7). The number of paths in the ISG is a function of the branching factor and the estimated distance between the source and destination. Further details on this calculation can be found in S. Moore, A Scalable Method for Interdomain Scheduling in Realtime IP Networks, 2001 (unpublished paper of Cetacean Networks, Inc., 100 Arboretum Drive, Portsmouth, N.H., 03801), which is hereby incorporated by reference herein in its entirety. If NTR queuing is used, it is implemented as part of Action (1). Another process or process thread will be responsible for managing the NTR queue and re-initiating requests.

Note that only local topology information and local scheduled state information were used to setup the itinerary, thereby demonstrating the distributed nature of the architecture.

Although the invention is shown and described with respect to an illustrative embodiment thereof, it should be appreciated that the foregoing and various other changes, omissions, and additions in the form and detail thereof could be implemented without departing from the spirit and scope of the underlying invention.

What is claimed is:

1. A method for scheduling real time data across a network comprising the steps of:
    collecting information about network topology including path information and appointment information;
    using said path information to identify a set of possible paths across a network to satisfy a connection request;
    for each path from said identified set, examining appointment slots along said path to determine if at least one complete path can be traversed using available appointments having an acceptable cumulative phase-shift, wherein said phase-shift is a difference, measured across each switching and transmission element between communicating endpoints, in a dimension selected from one or more of: frequency, flow mass, time-frequency, flow type, packet type, and packet mass, and wherein said phase shift is not related to packet jitter;
    until either a complete path is determined or said identified set of possible paths is exhausted;
    publishing an itinerary to each path element if said at least one complete path has been determined; or
    rejecting said connection request if said identified set of possible paths has been exhausted without determining at least one complete path.

2. The method of claim 1 in which said cumulative phase-shift is acceptable if it falls below a limit selected according to one or more of: pre-configured for a network or for an endpoint, configured according to connection request blocking probability requirements, network size, maximum allowable connection setup time, and available resources.

3. The method of claim 2 in which said available resources depend upon buffers in one or more of said path elements.

4. The method of claim 1 in which said acceptable cumulative phase shift is adjusted according to a measurement of network utilization.

5. The method of claim 1 in which said acceptable cumulative phase shift is adjusted according to the number of requests being rejected.

6. The method of claim 1 in which said step of examining appointment slots further comprises the steps of:
- obtaining a sequenced list of appointment schedules for each element along said path;
- for each said appointment schedule in said sequenced list, selecting a first appointment in said schedule available to handle a packet after a predetermined time, and rejecting said path if no appointment is available in said schedule within less than an acceptable phase-shift limit;
- until an appointment is selected for each element in said sequenced list.

7. The method of claim 6 in which said predetermined time is calculated according to whether an element in said sequenced list is a receiving interface or a transmitting interface of a scheduled network switch.

8. The method of claim 1 in which said step of examining appointment slots further comprises the steps of:
- obtaining a sequenced list of appointment schedules for each element along said path;
- for each said appointment schedule in said sequenced list, selecting a first appointment available to handle a packet after a predetermined time,
- queuing a request for said first available appointment if no acceptable appointments are currently available for said element;
- selecting said first available appointment if it becomes available within a predetermined time after queuing said request; and
- rejecting said path if no appointment within less than an acceptable phase-shift limit is available in said schedule after expiration of said predetermined time;
- until an appointment is selected for each element in said sequenced list.

9. The method of claim 1 in which said phase-shift is a difference in time measured across each switching and transmission element between communicating endpoints.

10. A method for scheduling real time data across a network comprising the steps of:
- identifying a set of possible paths across a network to satisfy a request; using predetermined graph traversal methods to search the identified set for available packet handling appointments until an available appointment path is found, or until predetermined halting criteria are reached, wherein said search includes, for each path from said identified set, examining appointment slots along said path to determine if at least one complete path can be traversed using available appointments having an acceptable cumulative phase-shift;
- until either a complete path is determined or said identified set of possible paths is exhausted;
- and if said identified set of possible paths has been exhausted without determining at least one complete path then rejecting said request;
- whereby search of said set of possible paths is constrained according to criteria derived from link utilization, network topology, and availability;
- wherein said phase-shift is a difference, measured across each switching and transmission element between communicating endpoints, in a dimension selected from one or more of: frequency, flow mass, time-frequency, flow type, packet type, and packet mass, and wherein said phase shift is not related to packet jitter;
- configuring said available appointment path, if one was found; and
- rejecting said request if said halting criteria are reached.

11. The method of claim 10 in which said predetermined graph traversal method is selected from one or more of:
breadth-first-search approach, branch-and-bound search approach, and depth-first-search approach.

12. An apparatus for forwarding packets at precise times in a packet switching system comprised of:
- a set of connected routers;
- each router configured for precise switching using packet ingress time on a port to index entries in a forwarding table;
- said entries containing forwarding information including egress port and egress time for each scheduled packet flow;
- and wherein the router will transmit each scheduled packet on said egress port at the egress time indexed by the ingress time for said flow;
- where said forwarding table entries are populated according to a network scheduling algorithm in which phase shift between said ingress time and said egress time is limited according to predetermined criteria influenced by system utilization and tolerance for delay in said flow, wherein said phase-shift is a difference, measured across each switching and transmission element between communicating endpoints, in a dimension selected from one or more of: frequency, flow mass, time-frequency, flow type, packet type, and packet mass, wherein said phase shift is not related to packet jitter.

13. The apparatus of claim 12 further comprised of:
- a schedule agent for collecting and managing router connection information and available ingress and egress times on each port on each router; and
- at least one end-point device for requesting a connection across said packet switching system;
- wherein said schedule agent receives requests from end-point devices and carries out said scheduling algorithm to determine a path by which a flow of packets can be transported via a series of available ingress times and egress times on available ports of each of said connected routers forming part of said path.

14. The apparatus of claim 12 in which said routers are configured to carry unscheduled data packets using ingress and egress times that have not been reserved for any of said schedule flows.

15. The apparatus of claim 12 in which each connected router is in communication with at least one schedule agent for the purpose of providing information in the set of: network topology, neighbor status, port status, schedule tables, schedule reports, end-point requests, and event reports; and for the purpose of receiving information in the set of: itinerary identifiers, interface indices for incoming and outgoing flows; flow type and length; max packet size; indicators for which appointments to receive and transmit packets, buffering delay parameters, and branching indicators.

16. The apparatus of claim 12 in which said scheduling algorithm further includes:
- means for marking ingress and egress times as either reserved or available;
- means for selecting and reserving a set of said times in response to a connection request;
- means for selecting only times marked as available for subsequent connection requests;
- means for rejecting connection requests for which a set of available times cannot be found within predetermined selection criteria; and
- means for adjusting said selection criteria in response to system utilization measurements.

* * * * *